United States Patent
Shimizu et al.

(10) Patent No.: US 12,137,174 B2
(45) Date of Patent: Nov. 5, 2024

(54) COMPUTER-READABLE RECORDING MEDIUM STORING INFORMATION PROCESSING PROGRAM, INFORMATION PROCESSING APPARATUS, AND SYSTEM

(71) Applicant: FUJITSU LIMITED, Kawasaki (JP)

(72) Inventors: Toshihiro Shimizu, Sagamihara (JP); Dai Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 265 days.

(21) Appl. No.: 17/737,060

(22) Filed: May 5, 2022

(65) Prior Publication Data

US 2023/0031804 A1 Feb. 2, 2023

(30) Foreign Application Priority Data

Jul. 27, 2021 (JP) ................................ 2021-122563

(51) Int. Cl.
*H04L 9/32* (2006.01)
*H04L 9/08* (2006.01)

(52) U.S. Cl.
CPC .......... *H04L 9/3263* (2013.01); *H04L 9/0825* (2013.01); *H04L 9/3247* (2013.01)

(58) Field of Classification Search
CPC ... H04L 9/3263; H04L 9/0825; H04L 9/3247; H04L 63/0884
See application file for complete search history.

(56) References Cited

U.S. PATENT DOCUMENTS 9,818,249 B1 * 11/2017 Fraser ..................... G07D 7/005
10,637,665 B1 * 4/2020 Sundaresan ........... H04L 63/083
(Continued)

FOREIGN PATENT DOCUMENTS

JP 2013-535859 A 9/2013
WO 2012/005546 A3 5/2012

OTHER PUBLICATIONS

Joon S. Park et al, Binding identities and attributes using digitally signed certificates, IEEE (Year: 2000).*
(Continued)

*Primary Examiner* — Shanto Abedin
(74) *Attorney, Agent, or Firm* — Fujitsu Intellectual Property Center

(57) ABSTRACT

A computer-readable recording medium storing a program to be executed by a first apparatus in a system of issuing attribute certificate information of each user, the program including instructions for causing a processor of the first apparatus to execute processing including: obtaining, from a second apparatus in the system, a value unique to an identifier that uniquely identifies a user, the second apparatus being a device capable of verifying authenticity of an electronic document to be signed; creating certificate information that includes attribute information identified from the attribute certificate information, certification information that certifies the attribute information, and the obtained value; generating an electronic signature for the electronic document and the certificate information using a private key that corresponds to the identifier; and outputting the electronic document and the certificate information to which the generated electronic signature is attached in association with the identifier.

8 Claims, 24 Drawing Sheets

(56) References Cited

U.S. PATENT DOCUMENTS

| | | | |
|---|---|---|---|
| 11,580,534 B2* | 2/2023 | Snow | H04L 9/50 |
| 11,863,686 B2* | 1/2024 | Deery | H04L 9/3247 |
| 2002/0116619 A1* | 8/2002 | Maruyama | H04L 9/3247 |
| | | | 713/176 |
| 2004/0093493 A1* | 5/2004 | Bisbee | H04L 9/3247 |
| | | | 713/156 |
| 2006/0053302 A1* | 3/2006 | Yasaki | H04L 9/0897 |
| | | | 713/176 |
| 2009/0031141 A1 | 1/2009 | Pearson et al. | |
| 2013/0110919 A1 | 5/2013 | An et al. | |
| 2016/0294845 A1 | 10/2016 | Jackson et al. | |
| 2016/0352523 A1* | 12/2016 | Bisbee | H04L 9/3263 |
| 2017/0078301 A1* | 3/2017 | Hosoda | H04L 9/3247 |
| 2018/0173906 A1* | 6/2018 | Rodriguez | H04L 9/3213 |
| 2022/0191044 A1* | 6/2022 | Kurita | H04L 9/3268 |
| 2022/0222381 A1* | 7/2022 | Dobryakova | G06Q 50/18 |
| 2022/0255755 A1* | 8/2022 | Nakama | H04L 9/3278 |

OTHER PUBLICATIONS

Hampiholi, Brinda et al., "Towards Practical Attribute-Based Signatures", Oct. 3, 2015, SAT 2015 18th International Conference, Austin, TX, USA, Sep. 24-27, 2015,; [Lecture Notes in Computer Science; Lect.Notes Computer], Springer, Berlin, Heidelberg, pp. 310-328, XP047320914.

Extended European Search Report dated Oct. 17, 2022 for corresponding European Patent Application No. 22171310.0, 7 pages.

* cited by examiner

FIG. 6

```
600
JOB TITLE: PRESIDENT
NAME: FUJI TARO
ADDRESS: XXX, NAKAHARA-KU, KAWASAKI CITY
DATE OF BIRTH: 1988/1/1
SOCIAL SECURITY AND TAX NUMBER: 123456···
AGE: 33

SIGNATURE: XXXX
```

FIG. 8

CERTIFICATION INFORMATION — 800

```
proof {
    proofs {
        primary_proof {
            revealed_attributes {
                name#1: value#1;
                    :
                name#m: value#m;
            }
            unrevealed_attributes {
                mj_hat#1;
                    :
                mj_hat#n;
            }
            credential_siganture_ZKP {
                a_prime;
                e_hat;
                v_hat;
            }
            predicate_attribute {
                u_hat1,,u_hat4;
                r_hat1,,r_hat4
                r_hat_delta;
                alfa_hat;
            }
        }
        non_revoc_proof {
            x_list;
        }
        aggregated_proof {
            c_hash;
        }
    }
}
```

FIG. 18

FIRST MANAGEMENT TABLE ~1800

| nonce | REMAINING NUMBER OF EFFECTIVE USES | VALIDITY PERIOD | SAVED PROOF LIST |
|---|---|---|---|
| "233cb0806bd5234c 4946c4bee5be61ae" | 10 | {start: "Jun 3 15:34:19 2021 +0900", end: "Jun 10 15:34:19 2021 +0900"} | proof1, proof2,··· |
| ··· | ··· | ··· | ··· |

SECOND MANAGEMENT TABLE ~2200

| DID | nonce | REMAINING NUMBER OF EFFECTIVE USES | VALIDITY PERIOD | VERIFIED PROOF LIST |
|---|---|---|---|---|
| "X1ngMp9LRfyM EtNz7WdiLa" | "233cb0806bd52 34c4946c4bee5b e61ae" | 10 | {start: "Jun 3 15:34:19 2021 +0900", end: "Jun 4 15:34:19 2021 +0900"} | proof1, proof2,... |
| "46YDuWSsMKV esZnXYsPpAJ" | "7d8da8e714e90 5c08b9dbbb8501 4f084" | 3 | {start: "Jun 4 12:26:00 2021 +0900", end: "Jun 5 12:26:00 2021 +0900"} | proof3, proof4,... |
| ... | ... | ... | ... | ... |

2200-1

2200-2

COMPUTER-READABLE RECORDING MEDIUM STORING INFORMATION PROCESSING PROGRAM, INFORMATION PROCESSING APPARATUS, AND SYSTEM

CROSS-REFERENCE TO RELATED APPLICATION

This application is based upon and claims the benefit of priority of the prior Japanese Patent Application No. 2021-122563, filed on Jul. 27, 2021, the entire contents of which are incorporated herein by reference.

FIELD

The embodiments discussed herein are related to an information processing program, an information processing apparatus, and a system.

BACKGROUND

In recent years, a self-sovereign identity (ID) distribution platform that distributes digitized identity information (ID information) as a certificate in a safe, secure, and easy manner with consent of a person pertaining to the ID information has been attracting attention. As a use case of the self-sovereign ID distribution platform, for example, there is a case in which a document is sent with an electronic signature of an organization or a representative attached, and authenticity of the document is verified on another party side using the electronic signature.

Examples of a prior art include a technique for generating, distributing, and storing a distribution certificate in a distribution system of an electronic document based on an official electronic address. Furthermore, there is also a system for generating and verifying authenticated electronic credentials.

Japanese National Publication of International Patent Application No. 2013-535859 and U.S. Laid-open Patent Publication No. 2016/0294845 are disclosed as related art.

SUMMARY

According to an aspect of the embodiments, there is provided a non-transitory computer-readable recording medium storing an information processing program to be executed by a first information processing apparatus in a system capable of issuing attribute certificate information of each user. In an example, the program includes instructions for causing a processor of the first information processing apparatus to execute processing including: obtaining, from a second information processing apparatus in the system, a value unique to an identifier that uniquely identifies a user, the second information processing apparatus being a device capable of verifying authenticity of an electronic document to be signed; creating certificate information that includes attribute information identified from the attribute certificate information, certification information that certifies the attribute information, and the obtained value; generating an electronic signature for the electronic document and the certificate information using a private key that corresponds to the identifier; and outputting the electronic document and the certificate information to which the generated electronic signature is attached in association with the identifier.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an explanatory diagram illustrating a specific example of a credential;

FIG. 8 is an explanatory diagram illustrating a specific example of certification information;

FIG. 18 is an explanatory diagram illustrating exemplary contents stored in a first management table 1800;

FIG. 22 is an explanatory diagram illustrating exemplary contents stored in a second management table 2200;

DESCRIPTION OF EMBODIMENTS

However, in the prevalent techniques, at a time of verifying authenticity of an electronic document, it is difficult to confirm an attribute of a signer and to verify correctness of the attribute. For example, while it is conceivable to attach, to the electronic document, a proof (certificate information) for certifying the attribute of the signer, it is not possible to make detection even if the proof is fraudulently obtained.

In one aspect, the embodiments aim to make it possible to detect a fraud of certificate information.

Hereinafter, embodiments of an information processing program, an information processing apparatus, and an information processing method will be described in detail with reference to the drawings.

First Embodiment

Figure 1:
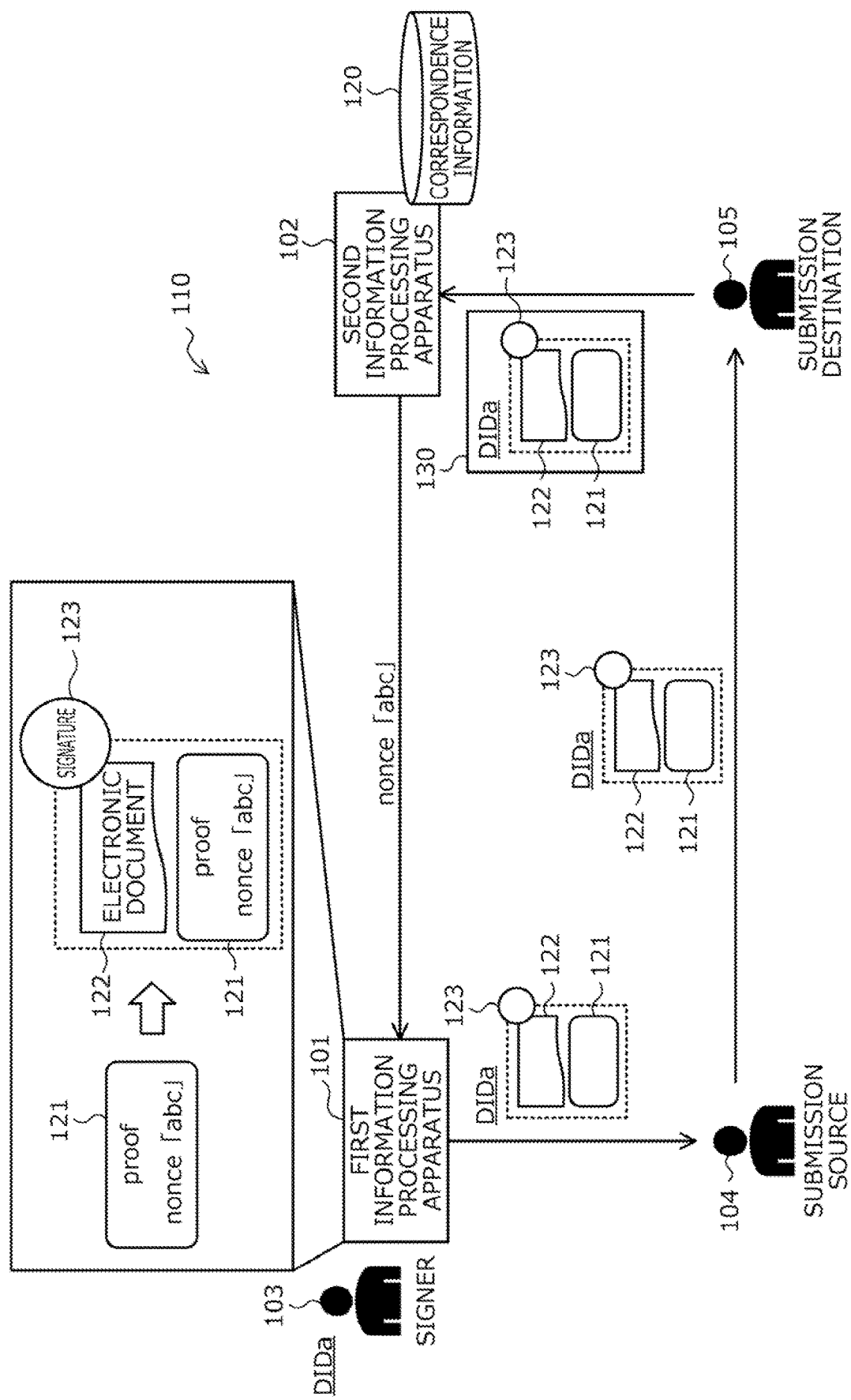
FIG. 1 is an explanatory diagram illustrating an example of an information processing method according to a first embodiment.

FIG. 1 is an explanatory diagram illustrating an example of an information processing method according to a first embodiment. In FIG. 1, a first information processing apparatus 101 is a computer that signs an electronic document to be signed. A second information processing apparatus 102 is a computer capable of verifying authenticity of the electronic document.

The electronic document is content used in an electronic form. For example, the electronic document is a document or an image created by various applications. Furthermore, the electronic document may be a paper document or the like read by a scanner and saved as electronic data.

The electronic document is signed by being attached with an electronic signature. The electronic signature is information for certifying authenticity (legitimacy) of data (electronic document). The electronic signature may be implemented by, for example, utilizing a public key cryptosystem.

Here, when verifying authenticity of an electronic document using an electronic signature, it is sometimes desired to ensure the correctness of the electronic document after grasping the attribute of the signer. For example, it is assumed that, when issuing an invoice for a certain company, the signature of the certain company's representative is needed. In this case, if it is not possible to confirm the attribute of the signer, it is not possible to know whether it is really the signature of the representative even though it can be confirmed that the invoice has not been tampered with.

For example, it is not possible to confirm the attribute of the signer and to verify the correctness thereof only by attaching the electronic signature. Therefore, for example, it is conceivable to attach certificate information that certifies the attribute of the signer to the electronic document. The certificate information includes attribute information of the signer and certification information for certifying the attribute information.

The attribute information is information associated with unique properties and features possessed by a human or a thing (name, gender, age, occupation, job title, etc.). The certification information is information for certifying the attribute information, and includes, for example, a plurality of variable groups. The verification of the certificate information is carried out using, for example, a protocol called zero-knowledge proof on the basis of the attribute information, the certification information, and a public key of the issuer of the certificate.

The certificate information is, for example, a proof created on the basis of attribute certificate information (credential) of the signer issued by an authentication authority. The attribute certificate information is information that indicates an attribute certificate of a user (signer). The attribute certificate information is, for example, information for certifying that the user is a legitimate person linked to identity information.

The identity information is, for example, a set of attributes (attributes and attribute values) that define a user. Examples of the attribute include a name, address, date of birth, social security and tax number, age, occupation, job title, career, and the like. The authentication authority is an authority that manages the identity information of the user (signer), which is, for example, a particular company (authentication company) or a particular department within a company.

In more detailed description, for example, the certificate information may reveal partial information of the attribute certificate information, or may conceal partial information of the attribute certificate information, or may certify whether the attribute certificate information satisfies a certain condition. Note that a specific example of the attribute certificate information (credential) will be described later with reference to FIG. 6. A specific example of the certificate information (proof) will be described later with reference to FIG. 7.

Meanwhile, the certificate information (proof) may be fraudulently obtained. For example, the signer may fraudulently obtain a proof created by another person to use it as his/her own proof. However, according to the prevalent techniques, it is not possible for a recipient to verify whether the proof is created from the signer's own credential even when the signer has diverted the proof of another person to sign.

In view of the above, in the first embodiment, descriptions will be given in relation to an information processing method that makes it possible to confirm the attribute of the signer and to detect a fraud of the certificate information (proof) attached to the electronic document to make it possible to verify the correctness at a time of verifying the authenticity of the electronic document. Hereinafter, an exemplary process of the first information processing apparatus 101 and the second information processing apparatus 102 will be described.

(1) The first information processing apparatus 101 obtains, from the second information processing apparatus 102, a value unique to an identifier corresponding to the identifier of the user. The identifier of the user is an identifier for uniquely identifying the user in a system 110. The system 110 is a system capable of issuing attribute certificate information of the user, which is, for example, a self-sovereign ID distribution platform.

The self-sovereign ID distribution platform is a system that distributes digitized identity information as a certificate in a safe, secure, and easy manner with consent of a person pertaining to the ID information. The first information processing apparatus 101 corresponds to, for example, a signature device in the system 110. The second information processing apparatus 102 corresponds to, for example, a verification device in the system 110.

In the self-sovereign ID distribution platform, it is possible to identify a communication partner by ID called decentralized identifiers (DID) that may be obtained by all participants. For example, the DID may be used as the user identifier. For example, a public key and a private key for an electronic signature are associated with the DID.

The value corresponding to the user identifier is a value unique to the user identifier, which is, for example, a random number (random character string). The value corresponding to the user identifier is transmitted from the second information processing apparatus 102 to the first information processing apparatus 101 in response to a request from the first information processing apparatus 101, for example. For example, a random number called a nonce may be used as the value corresponding to the user identifier. The user is, for example, a signer (e.g., president of a certain company).

In the example of FIG. 1, an identifier that uniquely identifies a signer 103 (user) is set as "DIDa", and a nonce corresponding to the DIDa is set as "abc". In this case, the first information processing apparatus 101 obtains, from the second information processing apparatus 102, the nonce "abc" corresponding to the DIDa of the signer 103, for example.

(2) The first information processing apparatus 101 creates certificate information including the attribute information identified from the attribute certificate information, the certification information for certifying the attribute information, and the obtained value. The attribute information may indicate a part of the attributes of the attribute certificate information, or may conceal a part of the attributes of the attribute certificate information, or may certify that the attributes of the attribute certificate information satisfy a certain condition.

In the example of FIG. 1, it is assumed that a proof 121 is created. The proof 121 includes the attribute information, the certification information, and the nonce "abc".

(3) The first information processing apparatus 101 generates an electronic signature for the electronic document to be signed and the certificate information. For example, the first information processing apparatus 101 generates the electronic signature for the electronic document to be signed and the certificate information using a private key corresponding to the identifier that uniquely identifies the user.

In the example of FIG. 1, it is assumed that an electronic signature 123 for an electronic document 122 and the proof 121 is generated using the private key corresponding to the DIDa. The electronic document 122 is an electronic document to be signed.

(4) The first information processing apparatus 101 outputs the electronic document and the certificate information to which the generated electronic signature is attached in association with the identifier for uniquely identifying the user. The output destination of the electronic document and the certificate information to which the electronic signature is attached is, for example, the submission source of the electronic document.

The submission source of the electronic document corresponds to a sender (e.g., an employee of a certain company) who sends the electronic document (e.g., an invoice of the certain company) to the submission destination. The submission destination of the electronic document corresponds to a recipient (e.g., an accountant of the certain company or an employee of a billing company) who receives the electronic document sent from the submission source.

In the example of FIG. 1, it is assumed that the electronic document 122 and the proof 121 to which the electronic signature 123 is attached are output to a submission source 104 of the electronic document 122 in association with the DIDa of the signer 103. The electronic document 122 and the proof 121 to which the electronic signature 123 is attached are sent from the submission source 104 of the electronic document 122 to a submission destination 105 of the electronic document 122, for example.

(5) The second information processing apparatus 102 receives the electronic document and the certificate information to which the electronic signature is attached in association with a first identifier for uniquely identifying the user in the system 110. The user is, for example, the signer who has signed the electronic signature.

In the example of FIG. 1, it is assumed that the second information processing apparatus 102 receives a verification request 130 from the submission destination 105 of the electronic document 122. The verification request 130 includes the DIDa of the signer 103, and the electronic document 122 and the proof 121 to which the electronic signature 123 is attached.

(6) The second information processing apparatus 102 refers to correspondence information 120, and detects a fraud of the certificate information in a case where a first value included in the certificate information does not match the value corresponding to the first identifier. The correspondence information 120 indicates a correspondence relationship between an identifier for uniquely identifying each user in the system 110 and a value unique to the identifier.

In the example of FIG. 1, the correspondence information 120 indicates a correspondence relationship between the DIDa and the nonce "abc". The second information processing apparatus 102 refers to the correspondence information 120 to determine whether or not the nonce included in the proof 121 matches the nonce corresponding to the DIDa. Here, the nonce included in the proof 121 is "abc".

Accordingly, the nonce included in the proof 121 is determined to match the nonce corresponding to the DIDa. In this case, the second information processing apparatus 102 determines that, for example, the creator of the proof 121 is the same person as the signer 103, and does not detect the fraud of the proof 121.

Note that, in a case where the proof 121 is fraudulently obtained, the nonce included in the proof 121 is a value of a user different from that of the signer 103. In this case, the nonce included in the proof 121 does not match the nonce corresponding to the DIDa, and the fraud of the proof 121 is detected.

Furthermore, the second information processing apparatus 102 may verify the electronic signature using the public key corresponding to the first identifier. For example, the second information processing apparatus 102 verifies the electronic signature 123 using the public key corresponding to the DIDa. As a result, it becomes possible to verify the authenticity of the electronic document 122.

For example, in a case where a verification result of the electronic signature 123 is verification OK, the second information processing apparatus 102 may detect that both the electronic document 122 and the proof 121 have not been tampered with. Furthermore, in a case where the verification result of the electronic signature 123 is verification NG, the second information processing apparatus 102 may detect that at least one of the electronic document 122 or the proof 121 has been tampered with.

Furthermore, the second information processing apparatus 102 may verify the certificate information on the basis of the attribute information and the certification information included in the received certificate information. The verification of the certificate information is carried out using, for example, the existing protocol called zero-knowledge proof on the basis of the attribute information, the certification information, and the public key of the issuer of the attribute certificate information. As a result, it becomes possible to verify the authenticity (not being tampered with) of the proof 121.

As described above, according to the first information processing apparatus 101 and the second information processing apparatus 102, it becomes possible to detect a fraud of the proof 121 on the basis of whether or not the nonce included in the proof 121 matches the nonce corresponding to the DIDa of the signer. As a result, it becomes possible to prevent fraudulent use of the proof 121 attached to confirm the attribute of the signer 103 when verifying the authenticity of the electronic document 122.

(Exemplary System Configuration of Information Processing System 200)

Next, an exemplary system configuration of the information processing system 200 according to the first embodiment will be described. In the following descriptions, a case where the first information processing apparatus 101 illustrated in FIG. 1 is applied to a signature device 201 in the information processing system 200 will be exemplified. Furthermore, a case where the second information processing apparatus 102 illustrated in FIG. 1 is applied to a verification server 204 in the information processing system 200 will be exemplified.

Furthermore, the attribute certificate information may be referred to as a "credential", and the certificate information created from the attribute certificate information may be referred to as a "proof". The information processing system 200 is applied to, for example, a self-sovereign ID distribution platform that distributes identity information (ID information) as a certificate with consent of a person pertaining to the ID information.

Figure 2:
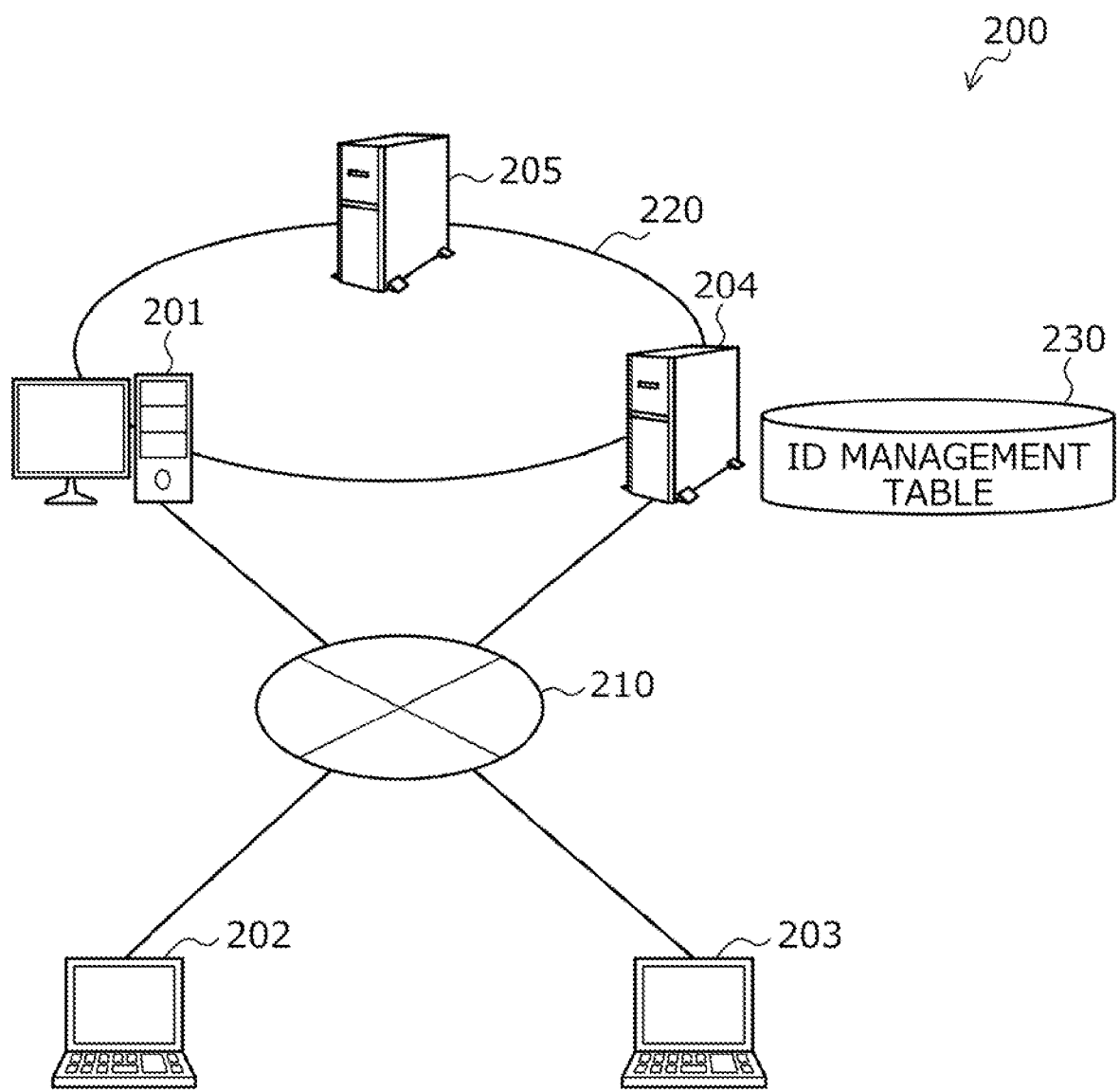
FIG. 2 is an explanatory diagram illustrating an exemplary system configuration of an information processing system 200.

FIG. 2 is an explanatory diagram illustrating an exemplary system configuration of the information processing system 200. In FIG. 2, the information processing system 200 includes the signature device 201, a user terminal 202, a user terminal 203, the verification server 204, and an authentication server 205. In the information processing system 200, the signature device 201, the user terminal 202, the user terminal 203, and the verification server 204 are connected via a wired or wireless network 210. For example, the network 210 is a local area network (LAN), a wide area network (WAN), the Internet, or the like.

Furthermore, the signature device 201, the verification server 204, and the authentication server 205 are included in an ID distribution platform 220. The ID distribution platform 220 is a self-sovereign ID distribution platform. In the ID distribution platform 220, the signature device 201, the verification server 204, and the authentication server 205 are connected via a dedicated network. The ID distribution platform 220 is one platform, and is implemented by, for example, a cloud.

Here, the signature device 201 is a computer that signs (electronically signs) an electronic document to be signed. The signature device 201 is, for example, a personal computer (PC), a tablet PC, or the like used by the signer.

The user terminal 202 is a computer used by a user to be a submission source (sender) of the electronic document. The user terminal 203 is a computer used by a user to be a submission destination (recipient) of the electronic document. For example, the user terminals 202 and 203 are PCs, tablet PCs, or the like.

Note that the submission source 104 illustrated in FIG. 1 corresponds to, for example, the user terminal 202. Furthermore, the submission destination 105 illustrated in FIG. 1 corresponds to, for example, the user terminal 203.

The verification server 204 is a computer that includes an ID management table 230 and is capable of verifying the authenticity of the electronic document. Exemplary contents stored in the ID management table 230 will be described later with reference to FIG. 5. The authentication server 205 is a computer that manages the credential (attribute certificate information) of the user (signer). The authentication server 205 is, for example, a server of an authentication company (authentication authority).

Note that, while only one signature device 201, user terminal 202 (submission source), user terminal 203 (submission destination), verification server 204, and authentication server 205 are individually depicted in the example of FIG. 2, it is not limited to this. For example, the information processing system 200 may include a plurality of the signature devices 201, user terminals 202 (submission sources), user terminals 203 (submission destinations), verification servers 204, and authentication servers 205 individually.

In the following descriptions, an identifier for uniquely identifying the user in the ID distribution platform 220 may be referred to as "DID", and a value unique to the DID corresponding to the DID managed in the verification server 204 may be referred to as a "nonce".

(Exemplary Hardware Configuration of Signature Device 201)

Next, an exemplary hardware configuration of the signature device 201 will be described.

Figure 3:
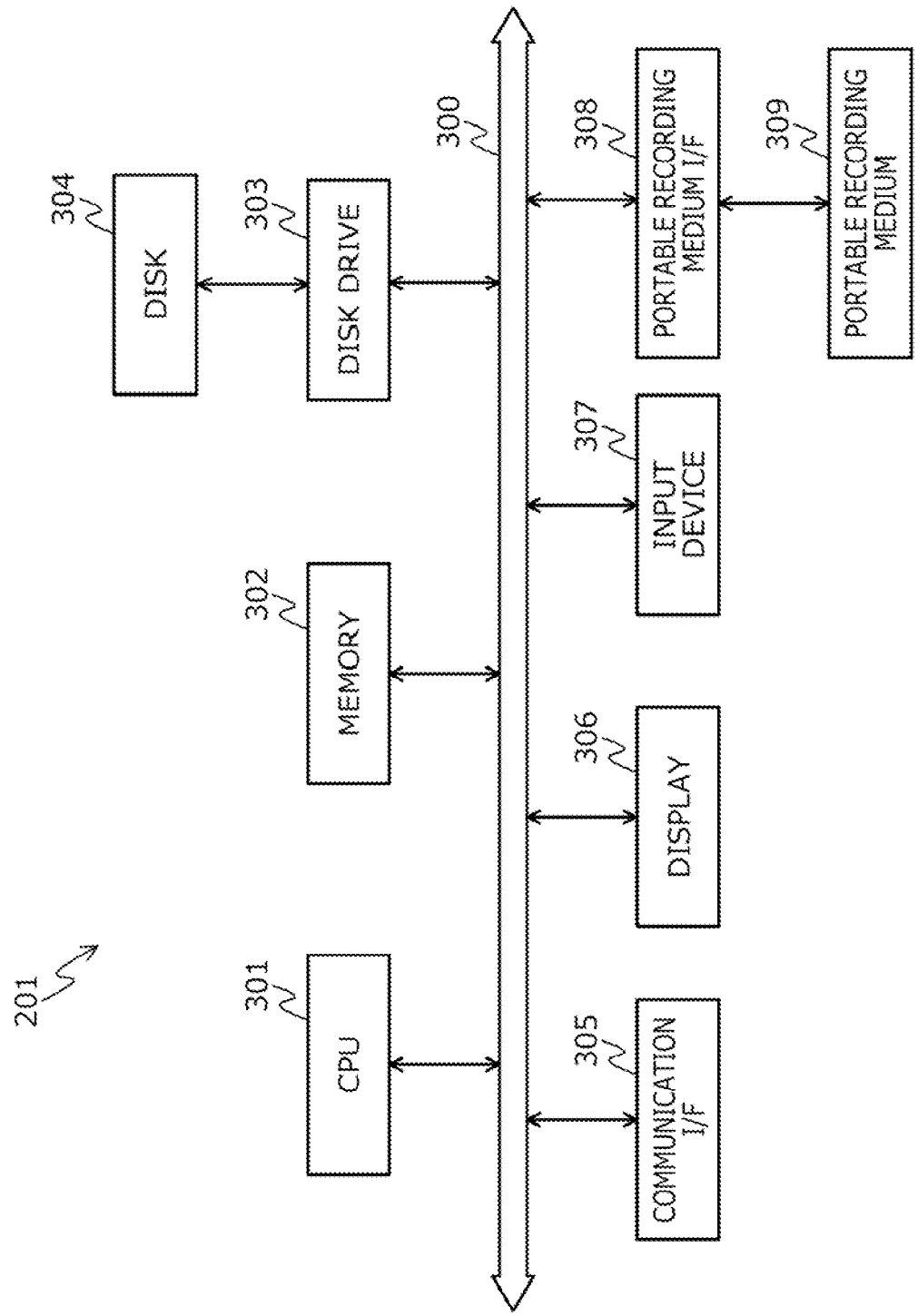
FIG. 3 is a block diagram illustrating an exemplary hardware configuration of a signature device 201.

FIG. 3 is a block diagram illustrating an exemplary hardware configuration of the signature device 201. In FIG. 3, the signature device 201 includes a central processing unit (CPU) 301, a memory 302, a disk drive 303, a disk 304, a communication interface (I/F) 305, a display 306, an input device 307, a portable recording medium I/F 308, and a portable recording medium 309. Furthermore, the individual components are mutually connected by a bus 300.

Here, the CPU 301 is in charge of overall control of the signature device 201. The CPU 301 may include a plurality of cores. For example, the memory 302 is a storage unit that includes a read only memory (ROM), a random access memory (RAM), a flash ROM, and the like. For example, the flash ROM or the ROM stores various programs, and the RAM is used as a work area for the CPU 301. The program stored in the memory 302 is loaded to the CPU 301 to cause the CPU 301 to execute coded processing.

The disk drive 303 controls reading/writing of data from/to the disk 304 under the control of the CPU 301. The disk 304 stores data written under the control of the disk drive 303. Examples of the disk 304 include a magnetic disk, an optical disk, and the like.

The communication I/F 305 is connected to a network (e.g., the network 210 and the ID distribution platform 220 illustrated in FIG. 2) through a communication line, and is connected to external computers (e.g., the user terminal 202, the verification server 204, and the authentication server 205) via the network. Then, the communication I/F 305 manages an interface between the network and the inside of its own device, and controls input/output of data from an external device.

The display 306 is a display device that displays data such as a document, an image, or function information, as well as a cursor, icons, or tool boxes. For example, a liquid crystal display, an organic electroluminescence (EL) display, or the like may be adopted as the display 306.

The input device 307 has keys for inputting characters, numbers, various commands, and the like, and inputs data. The input device 307 may be a keyboard, a mouse, or the like, or may be a touch-panel input pad, a numeric keypad, or the like.

The portable recording medium I/F 308 controls reading/writing of data from/to the portable recording medium 309 under the control of the CPU 301. The portable recording medium 309 stores data written under the control of the portable recording medium I/F 308. Examples of the portable recording medium 309 include a compact disc (CD)-ROM, a digital versatile disk (DVD), a universal serial bus (USB) memory, and the like.

Note that the signature device 201 may not include, for example, the disk drive 303, the disk 304, the portable recording medium I/F 308, or the portable recording medium 309 among the above-described components. Furthermore, the user terminals 202 and 203 illustrated in FIG. 2 may also be implemented by a hardware configuration similar to the hardware configuration of the signature device 201.

(Exemplary Hardware Configuration of Verification Server 204)

Next, an exemplary hardware configuration of the verification server 204 will be described.

Figure 4:
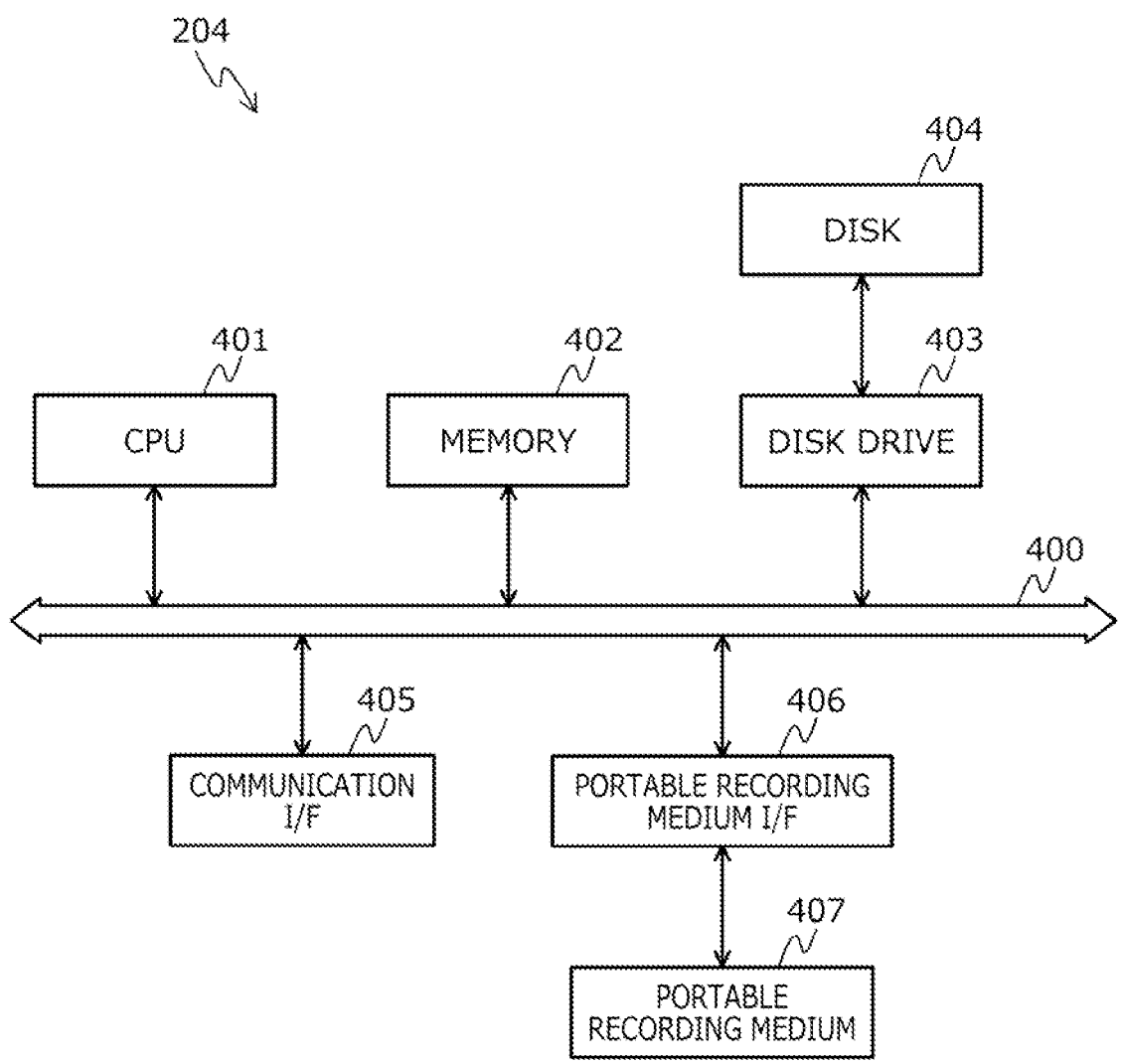
FIG. 4 is a block diagram illustrating an exemplary hardware configuration of a verification server 204.

FIG. 4 is a block diagram illustrating an exemplary hardware configuration of the verification server 204. In FIG. 4, the verification server 204 includes a CPU 401, a memory 402, a disk drive 403, a disk 404, a communication I/F 405, a portable recording medium I/F 406, and a portable recording medium 407. Furthermore, the individual components are mutually connected by a bus 400.

Here, the CPU 401 is in charge of overall control of the verification server 204. The CPU 401 may include a plurality of cores. For example, the memory 402 includes a ROM, a RAM, a flash ROM, and the like. For example, the flash ROM stores an operating system (OS) program, the ROM stores application programs, and the RAM is used as a work area for the CPU 401. A program stored in the memory 402 is loaded to the CPU 401 to cause the CPU 401 to execute coded processing.

The disk drive 403 controls reading/writing of data from/to the disk 404 under the control of the CPU 401. The disk 404 stores data written under the control of the disk drive 403. Examples of the disk 404 include a magnetic disk, an optical disk, and the like.

The communication I/F 405 is connected to a network (e.g., the network 210 and the ID distribution platform 220 illustrated in FIG. 2) through a communication line, and is connected to external computers (e.g., the signature device 201 and the user terminal 203 illustrated in FIG. 2) via the network. Then, the communication I/F 405 manages an interface between the network and the inside of its own device, and controls input/output of data from an external computer. For example, a modem, a LAN adapter, or the like may be adopted as the communication I/F 405.

The portable recording medium I/F 406 controls reading/writing of data from/to the portable recording medium 407 under the control of the CPU 401. The portable recording medium 407 stores data written under the control of the portable recording medium I/F 406.

Note that the verification server 204 may include, for example, an input device, a display, or the like in addition to the above-described components. Furthermore, the verification server 204 may not include, for example, the disk drive 403, the disk 404, the portable recording medium I/F 406, or the portable recording medium 407 among the above-described components. Furthermore, the authentication server 205 illustrated in FIG. 2 may also be implemented by a hardware configuration similar to the hardware configuration of the verification server 204.

(Contents Stored in ID Management Table 230)

Next, the contents stored in the ID management table 230 included in the verification server 204 will be described with reference to FIG. 5. The ID management table 230 is implemented by, for example, a storage device such as the memory 402 and the disk 404 of the verification server 204 illustrated in FIG. 4.

Figure 5:
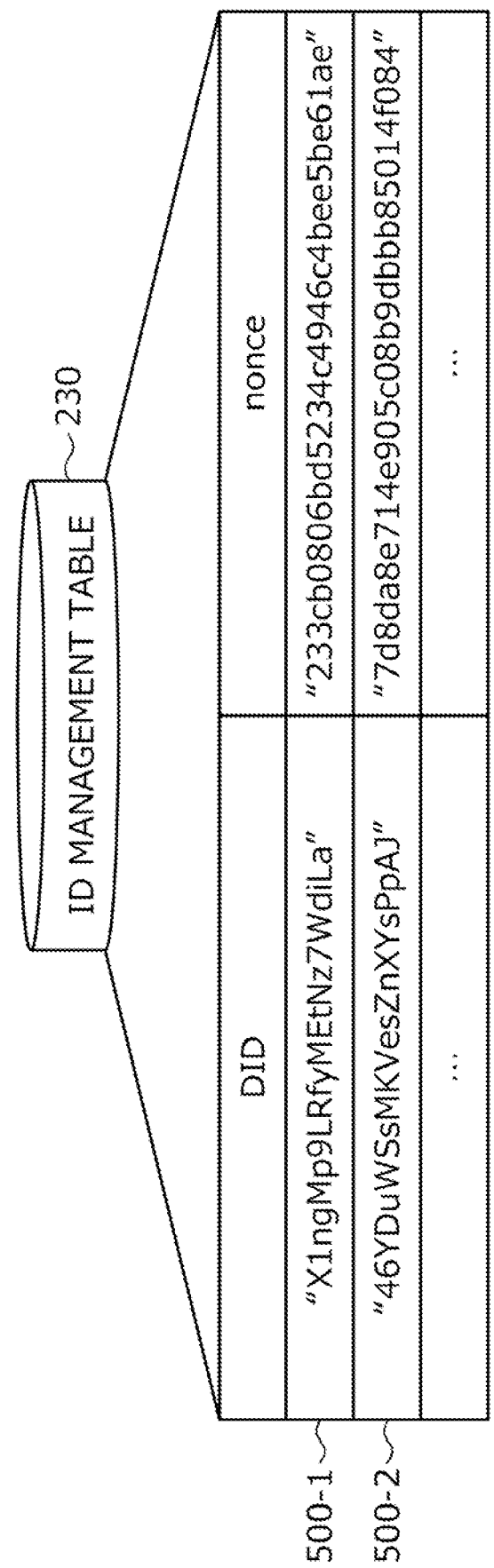
FIG. 5 is an explanatory diagram illustrating exemplary contents stored in an ID management table 230.

FIG. 5 is an explanatory diagram illustrating exemplary contents stored in the ID management table 230. In FIG. 5, the ID management table 230 has fields for the DID and the nonce, and sets information in each field, thereby storing ID management information (e.g., ID management information 500-1 and 500-2) as records.

Here, the DID is an identifier for uniquely identifying the user in the ID distribution platform 220. The nonce is a random number unique to the DID, which is assigned corresponding to the DID. For example, the management information 500-1 indicates the correspondence relationship between the DID "X1ngMp9LRfyMEtNz7WdiLa" and the nonce "233cb0806bd5234c4946c4bee5be61ae".

(Specific Example of Credential)

Next, a specific example of the credential will be described with reference to FIG. 6.

FIG. 6 is an explanatory diagram illustrating a specific example of the credential. In FIG. 6, a credential 600 is an exemplary credential (attribute certificate information) issued from the authentication server 205. The credential 600 is information that certifies the attributes of the signer.

Here, as the attributes of the signer, the job title "president", the name "Fuji Taro", the address "XXX, Nakahara-ku, Kawasaki city", the date of birth "1988 Jan. 1", the social security and tax number "123456 . . . ", and the age "33" are indicated. Furthermore, a signature "XXXX" is attached to the credential 600 with the private key of the issuer (e.g., authentication company) on the basis of the electronic signature mechanism.

(Specific Example of Proof)

Next, a specific example of the proof will be described with reference to FIG. 7.

Figure 7:
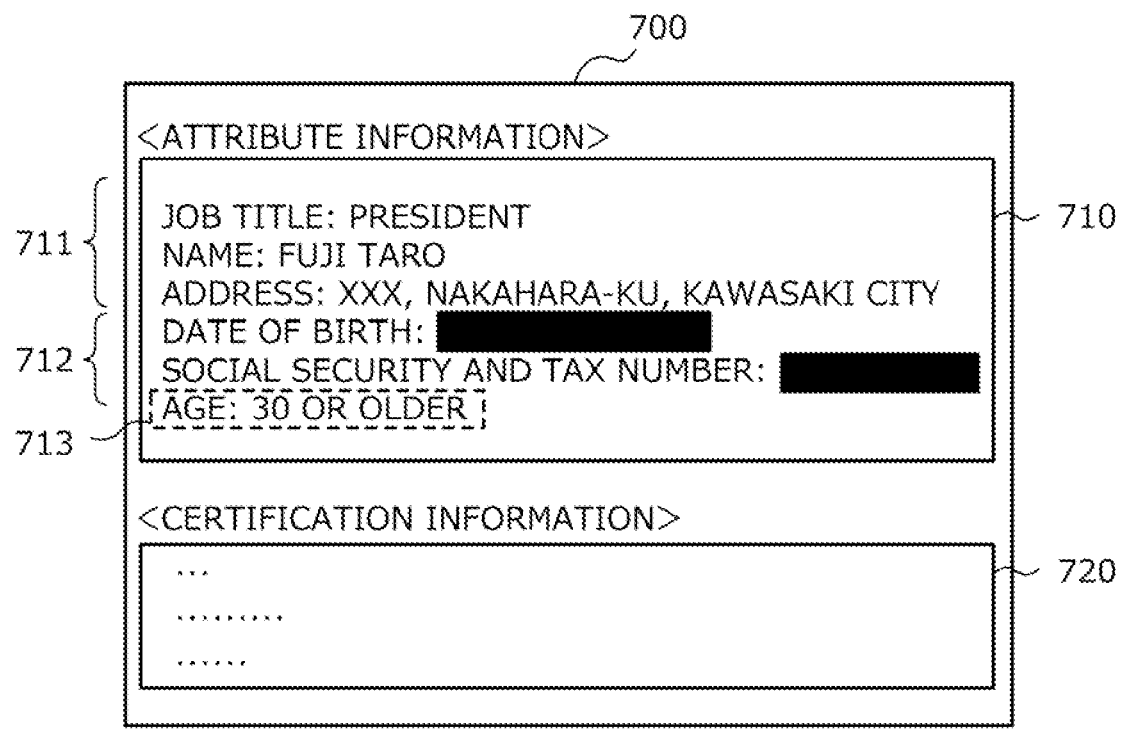
FIG. 7 is an explanatory diagram illustrating a specific example of a proof.

FIG. 7 is an explanatory diagram illustrating a specific example of the proof. In FIG. 7, a proof 700 is an exemplary proof (certificate information) created from the credential 600 illustrated in FIG. 6. The proof 700 includes attribute information 710 and certification information 720.

The attribute information 710 includes revealed attribute information 711, unrevealed attribute information 712, and condition certification information 713. The revealed attribute information 711 is information in the credential 600 to be revealed. The unrevealed attribute information 712 is information in which attributes in the credential 600 that do not need to be revealed are concealed by blackening processing.

The condition certification information 713 is information (range certification) certifying that the condition of whether or not the age contained in the credential 600 is 30 years old or older is satisfied. The certification information 720 is information (a plurality of variable groups) for certifying the attribute information 710. The certification information 720 includes, for example, a nonce. A specific example of the certification information 720 will be described later with reference to FIG. 8.

FIG. 8 is an explanatory diagram illustrating a specific example of the certification information. In FIG. 8, certification information 800 (e.g., corresponding to the certification information 720 illustrated in FIG. 7) includes a group of responses for zero-knowledge proof (ZKP). The element primary_proof has a group of responses for ZKP regarding the attributes. The element revealed_attributes indicate revealed attributes.

The elements name #1: value #1 and the like indicate the values of individual revealed attributes. The number of bits of the values of the individual revealed attributes depend on the values of the individual revealed attributes. The element unrevealed_attributes indicates unrevealed attributes. The elements mj_hat #1 and the like indicate responses for ZKP of individual unrevealed attributes.

The element credential_siganture_ZKP indicates responses for ZKP of the signature (a, e, v) in the credential. The element predicate_attribute indicates condition certification. The elements u_hat1, u_hat4 and the like indicate responses for ZKP for each condition certification.

The element non_revoc_proof indicates a response for ZKP of non-revocation certification. The element aggregated_proof indicates a challenge hash. According to the certification information 800, the correctness of the certification attribute may be verified by the zero-knowledge proof (ZKP) protocol from the ZKP response and the challenge hash.

(Exemplary Functional Configuration of Signature Device 201)

Figure 9:
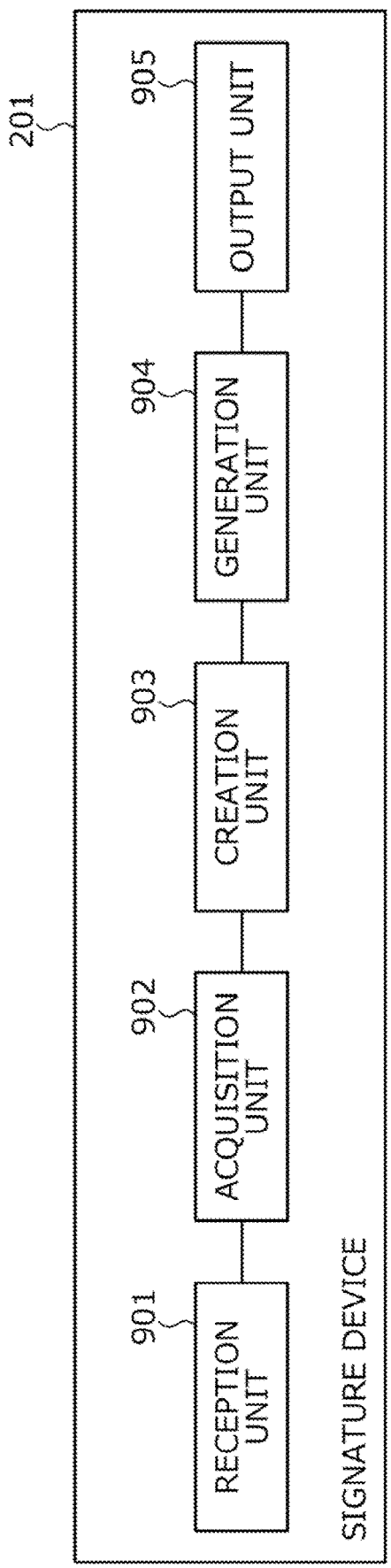
FIG. 9 is a block diagram illustrating an exemplary functional configuration of the signature device 201 according to the first embodiment.

FIG. 9 is a block diagram illustrating an exemplary functional configuration of the signature device 201 according to the first embodiment. In FIG. 9, the signature device 201 includes a reception unit 901, an acquisition unit 902, a creation unit 903, a generation unit 904, and an output unit 905. The reception unit 901 to the output unit 905 have functions serving as a control unit, and those functions are implemented by causing the CPU 301 to execute the program stored in the storage device such as the memory 302, the disk 304, or the portable recording medium 309, illustrated in FIG. 3, or by the communication I/F 305, for example. A processing result of each functional unit is stored in, for example, a storage device such as the memory 302 or the disk 304.

The reception unit 901 accepts a signing request for an electronic document. The signing request requests that an electronic signature be attached to the electronic document. The signing request contains the electronic document to be signed. In the following descriptions, the electronic document to be signed may be referred to as an "electronic document D".

For example, the reception unit 901 receives the signing request from the user terminal 202 illustrated in FIG. 2, thereby accepting the signing request for the electronic document D. Furthermore, the reception unit 901 may accept the signing request for the electronic document D in accordance with an operation input from a user using the input device 307 illustrated in FIG. 3.

The acquisition unit 902 obtains the credential (attribute certificate information) of the signer issued by the authentication authority. For example, the acquisition unit 902 obtains the credential 600 (see FIG. 6) from the authentication server 205 (e.g., authentication company) illustrated in FIG. 2 via the ID distribution platform 220 in response to the signing request for the electronic document D. However, the credential of the signer may be obtained in advance, for example, prior to the signing request for the electronic document D.

Furthermore, the acquisition unit 902 obtains the nonce corresponding to the DID of the signer from the verification server 204. For example, the acquisition unit 902 transmits an offer to the verification server 204 illustrated in FIG. 2 in response to the signing request for the electronic document D. The offer is notification for requesting, to the verification server 204, the nonce needed to create the proof.

The offer includes, for example, the DID of the signer. Then, the acquisition unit 902 receives the nonce from the verification server 204, thereby obtaining the nonce corresponding to the DID of the signer. However, the nonce corresponding to the DID of the signer may be obtained in advance, for example, prior to the signing request for the electronic document D.

The creation unit 903 creates a proof (certificate information) of the signer on the basis of the credential of the signer. The proof includes the attribute information of the signer, the certification information for certifying the attribute information, and the nonce corresponding to the DID of the signer. The attribute information is information that indicates the attribute identified from the credential of the signer.

The attribute information includes, for example, at least one of information regarding an attribute included in the credential (revealed attribute), information in which information regarding the attribute included in the credential is concealed (unrevealed attribute), and information certifying that information regarding the attribute included in the credential satisfies a particular condition (condition certification). The nonce corresponding to the DID of the signer is the nonce obtained by the acquisition unit 902.

For example, the creation unit 903 conceals the attribute that does not need to be revealed or certifies whether the certain condition is satisfied on the basis of the obtained credential 600 in accordance with an operation input from the user, thereby creating the attribute information 710. Furthermore, the creation unit 903 creates the certification information 720 including the obtained nonce in accordance with an operation input from the user. Then, the creation unit 903 creates the proof 700 (see FIG. 7) including the created attribute information 710 and the certification information 720 (including nonce) in accordance with an operation input from the user.

The generation unit 904 generates an electronic signature for the electronic document D and the proof. For example, the generation unit 904 calculates a hash value of the electronic document D. The hash value is calculated using a hash function (cryptographic one-way hash function). The hash value generated using the cryptographic one-way hash function has features that the hash value is given as the sole information that can only be generated from the generation source data, and it is not possible to restore the original data from the generated hash value. Furthermore, according to the hash function, for example, it is possible to compress data to a fixed size (length).

Next, the generation unit 904 sets the calculated hash value of the electronic document D in the field of the proof 700, thereby creating the proof 700 including the hash value of the electronic document D. Furthermore, the generation unit 904 calculates a hash value of the proof 700 including the hash value of the electronic document D.

Then, the generation unit 904 encrypts the calculated hash value using the private key corresponding to the DID of the signer, thereby generating an electronic signature. The private key corresponding to the DID of the signer is stored in, for example, the memory 302, the disk 304, or the like. As a result, it becomes possible to sign the electronic document D to which the proof 700 is attached. In the following descriptions, the electronic signature for the electronic document D and the proof may be referred to as an "electronic signature S".

The output unit 905 outputs the electronic document D and the proof to which the generated electronic signature S is attached in association with the DID of the signer. Examples of an output format of the output unit 905 include storage to a storage device such as the memory 302 or the disk 304, transmission to another computer using the communication I/F 305, display on the display 306, and the like.

For example, the output unit 905 assigns the generated electronic signature S to the electronic document D and the proof in association with the DID of the signer, and transmits it to the submission source of the electronic document D. Here, the submission source of the electronic document D corresponds to the sender who sends the electronic document D to the submission destination. The submission source of the electronic document D is, for example, the user terminal 202, which is the requesting source of the signing request for the electronic document D.

In more detailed description, for example, the output unit 905 assigns the electronic signature S to the electronic document D to which the proof 700 is attached. Then, the output unit 905 transmits a signature response to the user terminal 202, which is the requesting source, via the network 210. The signature response includes the DID of the signer, the electronic document D to which the proof 700 is attached, and the electronic signature S.

Upon reception of the signer response, for example, the user terminal 202 transmits the DID of the signer included in the signature response, the electronic document D to which the proof 700 is attached, and the electronic signature S to the user terminal 203 to be the submission destination of the electronic document D via the network 210. The submission destination of the electronic document D corresponds to the recipient who receives the electronic document D sent from the submission source. For example, the transmission to the submission destination is performed by electronic mail or the like.

(Exemplary Functional Configuration of Verification Server 204)

Figure 10:
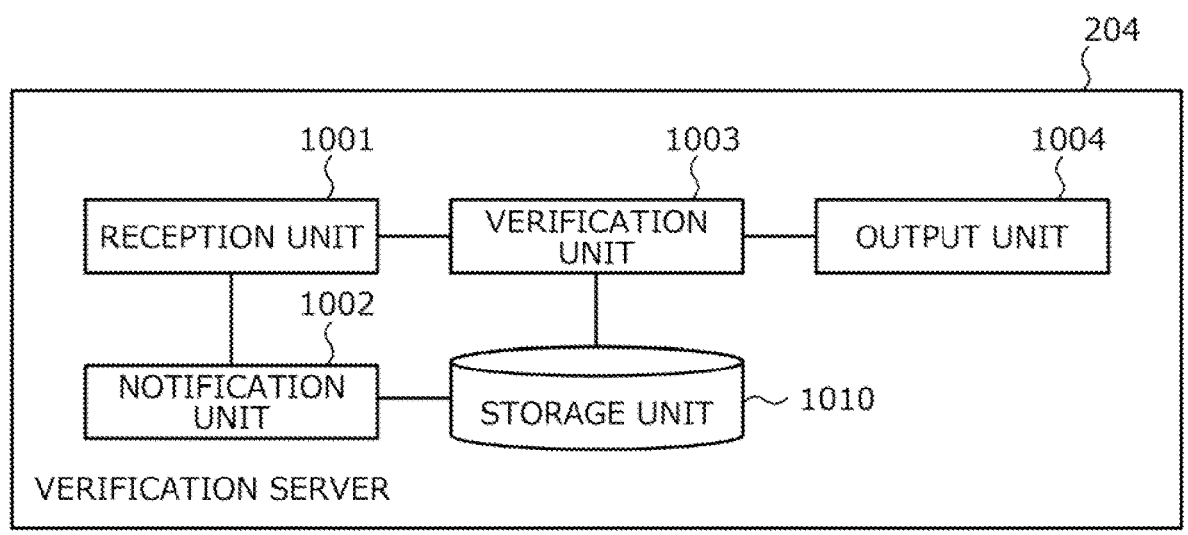
FIG. 10 is a block diagram illustrating an exemplary functional configuration of the verification server 204 according to the first embodiment.

FIG. 10 is a block diagram illustrating an exemplary functional configuration of the verification server 204 according to the first embodiment. In FIG. 10, the verification server 204 includes a reception unit 1001, a notification unit 1002, a verification unit 1003, an output unit 1004, and a storage unit 1010. The reception unit 1001 to the output unit 1004 have functions serving as a control unit, and those functions are implemented by causing the CPU 401 to execute the program stored in the storage device such as the memory 402, the disk 404, or the portable recording medium 407, illustrated in FIG. 4, or by the communication I/F 405, for example. The processing result of each functional unit is stored in, for example, a storage device such as the memory 402 or the disk 404. Furthermore, the storage unit 1010 is implemented by a storage device such as the memory 402 or the disk 404. For example, the storage unit 1010 stores the ID management table 230 illustrated in FIG. 5.

The reception unit 1001 accepts the offer. Here, the offer is notification for requesting the nonce needed to create the proof. For example, the reception unit 1001 receives the offer from the user terminal 203 via the network 210. The offer includes, for example, the DID of the user (signer). The notification unit 1002 makes notification of the nonce corresponding to the DID of the user. For example, the notification unit 1002 creates a random number corresponding to the DID (DID of the communication partner) included in the offer in response to the acceptance of the offer. The created random number is a value that does not match any nonce corresponding to another DID.

In more detailed description, for example, the notification unit 1002 may create a random number (random character string) from the credential of the user (signer) identified by the DID using the hash function. However, the nonce corresponding to the DID of the user may be created in advance and stored in a storage device such as the memory 402 or the disk 404.

Then, the notification unit 1002 transmits, for example, the created random number as a nonce to the user terminal 203, which is the transmission source of the offer. Furthermore, the notification unit 1002 stores the created nonce in the ID management table 230 illustrated in FIG. 5 in association with the DID of the user (signer).

Furthermore, the reception unit 1001 receives the electronic document D and the proof to which the electronic signature S is attached in association with the DID (first identifier) of the signer. For example, the reception unit 1001 receives a verification request from the user terminal 203 via the network 210. The verification request is, for example, for requesting verification of authenticity of the electronic document D.

The verification request includes, for example, the DID (first identifier) of the signer, the electronic document D to which the proof is attached, and the electronic signature S. The proof includes a nonce (first value). Then, the reception unit 1001 receives the DID of the signer, the electronic document D to which the proof is attached, and the electronic signature S included in the received verification request.

Note that the reception unit 1001 may accept the verification request in accordance with an operation input from the user using an input device (not illustrated) of the verification server 204.

The verification unit 1003 refers to the storage unit 1010, and in a case where the nonce (first value) included in the received proof does not match the nonce corresponding to the DID (first identifier), it detects a proof fraud. The storage unit 1010 stores information indicating a correspondence relationship between the DID for uniquely identifying each user in the ID distribution platform 220 and the nonce (random number) unique to the DID.

For example, the verification unit 1003 refers to the ID management table 230 illustrated in FIG. 5, and identifies the nonce corresponding to the received DID (first identifier). Next, the verification unit 1003 determines whether or not the nonce (first value) included in the received proof matches the identified nonce.

Here, in a case where the nonce (first value) does not match the identified nonce, the verification unit 1003 detects the proof fraud. On the other hand, in a case where the nonce (first value) matches the identified nonce, the verification unit 1003 does not detect the proof fraud.

Note that the verification unit 1003 may refer to the ID management table 230 to identify the DID corresponding to the nonce (first value) included in the received proof. Then, the verification unit 1003 may determine that the nonce (first value) included in the proof does not match the nonce corresponding to the DID (first identifier) in a case where the received DID (first identifier) does not match the identified DID.

Furthermore, the verification unit 1003 verifies the electronic signature S using the public key corresponding to the received DID. For example, the verification unit 1003 calculates a hash value of the electronic document D to which the proof is attached. However, the function same as the hash function used at the time of generating the electronic signature S in the signature device 201 is used.

In more detailed description, for example, the verification unit 1003 calculates a hash value of the received electronic document D. Next, the verification unit 1003 sets the calculated hash value of the electronic document D in the field of the proof, thereby creating the proof including the hash value of the electronic document D. Then, the verification unit 1003 calculates a hash value of the proof including the hash value of the electronic document D.

Next, the verification unit 1003 obtains the public key corresponding to the received DID, and decrypts the electronic signature S using the obtained public key. Then, the verification unit 1003 compares the hash value obtained by the decryption with the calculated hash value. Here, in a case where the hash values match with each other, the verification unit 1003 regards that the verification is approved (electronic document D to which the proof is attached is correct).

On the other hand, in a case where the hash values do not match with each other, the verification unit 1003 regards that the verification is disapproved (electronic document D to which the proof is attached is not correct). As a result, it becomes possible to verify the authenticity (the electronic document D and the proof have not been tampered with) of the electronic document D to which the proof is attached.

Furthermore, the verification unit 1003 may determine, for example, whether or not the hash value of the received electronic document D matches the hash value of the electronic document D included in the proof. Here, in a case where the hash values match with each other, the verification unit 1003 determines that the received electronic document D has not been tampered with. On the other hand, in a case where the hash values do not match with each other, the verification unit 1003 determines that the received electronic document D has been tampered with.

As a result, the verification unit 1003 is enabled to detect that the proof has been fraudulently created in a case where, for example, the electronic document D is not tampered with when the verification is disapproved (electronic document D to which the proof is attached is not correct) as a result of the verification of the electronic signature S.

Furthermore, the verification unit 1003 verifies the authenticity of the proof on the basis of the attribute information and the certification information included in the received proof. The verification of the proof is carried out on the basis of, for example, the attribute information (see FIG. 7), the certification information (see FIG. 8), and the public key of the issuer of the credential using the existing protocol called zero-knowledge proof.

In the zero-knowledge proof, the correctness of the certification attribute is verified by the zero-knowledge proof (ZKP) protocol from the ZKP response and the challenge hash. In more detailed description, for example, the verification unit 1003 verifies the correctness of the certification attribute from a value obtained by performing arithmetic operations on the certification attribute and the challenge hash with an arithmetic method (e.g., AND or OR) designated by the ZKP response, and the ZKP response ((the certification attribute and the challenge hash)→the ZKP response).

The output unit 1004 outputs the verification result. Examples of an output format of the output unit 1004 include storage to a storage device such as the memory 402 or the disk 404, transmission to another computer using the communication I/F 405, and the like. Here, the verification result indicates whether or not a proof fraud (fraudulent use) has been detected. Furthermore, the verification result may indicate the authenticity (not being tampered with) of the electronic document D to which the proof is attached. Furthermore, the verification result may indicate the authenticity (not being tampered with) of the proof.

For example, the output unit 1004 transmits the verification result to the user terminal 203, which is the requesting source of the verification request, via the network 210. As a result, it becomes possible to confirm that the proof is not fraudulently used, and that the electronic document D and the proof are not tampered with.

Furthermore, the verification result may include, for example, the attribute information included in the proof. As a result, it becomes possible to confirm the attribute of the signer on the side of the user terminal 203 (recipient).

Note that the verification request may request detection of fraudulent use of the proof. In this case, the verification unit 1003 only detects, for example, a proof fraud (fraudulent use). The verification of the electronic signature S and the verification that the proof has not been tampered with may be carried out on the side of the user terminal 203 (recipient).

(Exemplary Proof Fraud Detection)

Next, exemplary detection of a proof fraud will be described with reference to FIGS. 11 to 13. First, it is assumed that the sender (requesting source of the signing request for the electronic document D) of the electronic document D is a malicious sender.

Figure 11:
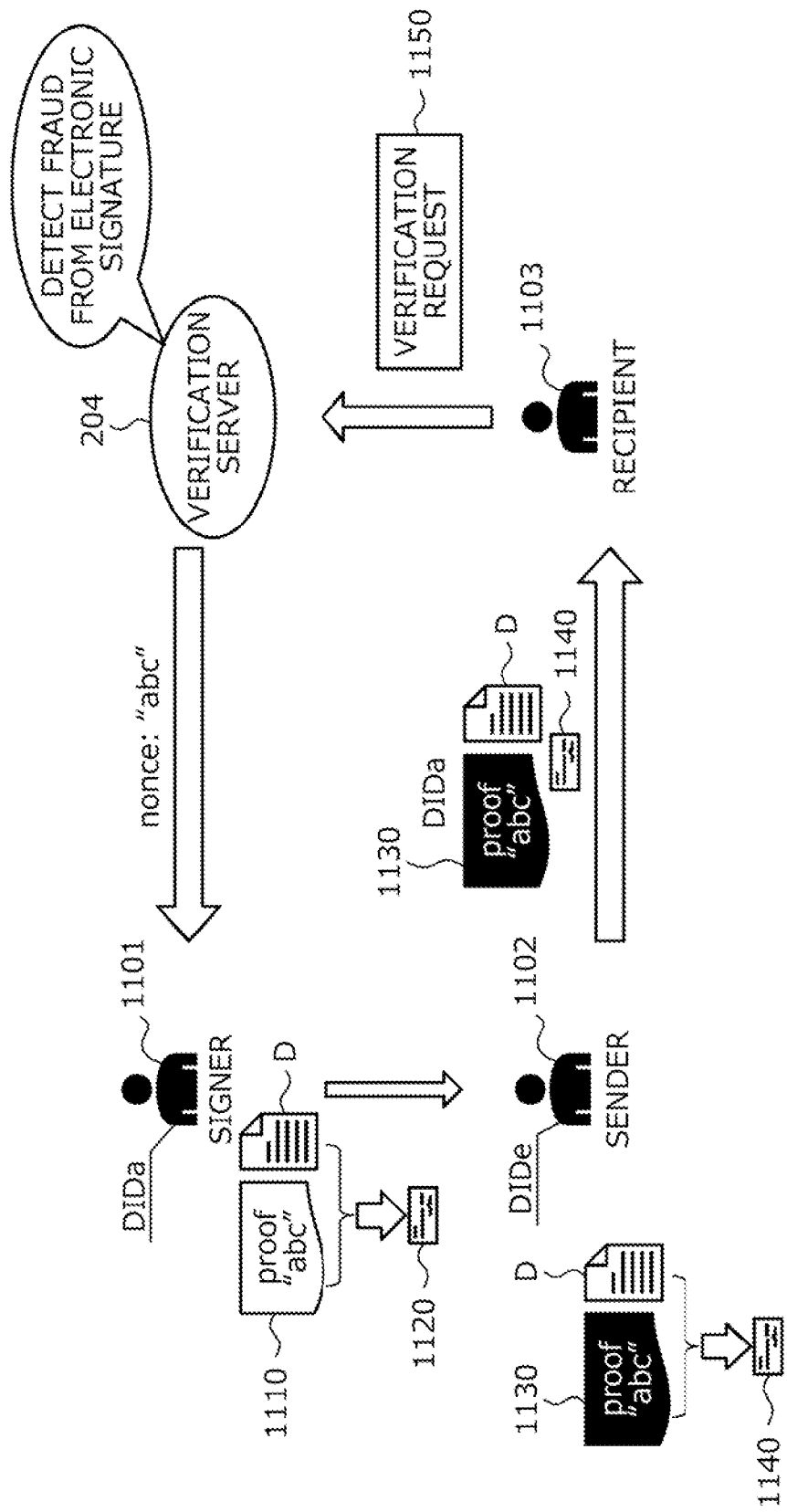
FIG. 11 is an explanatory diagram illustrating first exemplary detection of a proof fraud.

FIG. 11 is an explanatory diagram illustrating first exemplary detection of a proof fraud. In FIG. 11, in response to an offer from a signer 1101 (signature device 201), the verification server 204 creates a nonce "abc" corresponding to the DIDa of the signer 1101, and registers it in the ID management table 230. Furthermore, the verification server 204 transmits the nonce "abc" corresponding to the DIDa of the signer 1101 to the signer 1101 (signature device 201).

The signer 1101 obtains the nonce "abc" corresponding to his/her own DIDa from the verification server 204. The signer 1101 creates a proof 1110 on the basis of his/her own credential. The proof 1110 includes the attribute information of the signer 1101, the certification information for certifying the attribute information, and the nonce "abc" corresponding to the DIDa of the signer 1101.

Next, the signer 1101 (signature device 201) generates an electronic signature 1120 for the electronic document D and the proof 1110 using the private key corresponding to his/her own DIDa. The signer 1101 (signature device 201) transmits, to a sender 1102 (user terminal 202), the electronic document D and the proof 1110 to which the electronic signature 1120 is attached in association with his/her own DIDa.

Here, it is assumed that the sender 1102 is a malicious sender, and has stolen a glance at the nonce "abc" corresponding to the DIDa of the signer 1101 to create a proof 1130 on the basis of his/her own credential. The proof 1130 includes the attribute information of the sender 1102, the certification information for certifying the attribute information, and the nonce "abc" corresponding to the DIDa of the signer 1101.

The sender 1102 does not have the private key corresponding to the DIDa of the signer 1101. Accordingly, the sender 1102 generates an electronic signature 1140 for the electronic document D and the proof 1130 using the private key of his/her own DIDe. For example, the sender 1102 (user terminal 202) first calculates a hash value of the electronic document D.

Next, the sender 1102 (user terminal 202) sets the calculated hash value in the field of the proof 1130, thereby creating the proof 1130 including the hash value of the electronic document D. Next, the sender 1102 (user terminal 202) calculates a hash value of the proof 1130 including the hash value of the electronic document D.

Then, the sender 1102 (user terminal 202) encrypts the calculated hash value using the private key corresponding to his/her own DIDe, thereby creating the electronic signature 1140. Then, the sender 1102 (user terminal 202) transmits, to a recipient 1103 (user terminal 203), the electronic document D and the electronic signature 1140 to which the proof 1130 is attached in association with the DIDa of the signer 1101.

When the recipient 1103 (user terminal 203) receives the electronic document D and the electronic signature 1140 to which the proof 1130 is attached in association with the DIDa, it transmits a verification request 1150 to the verification server 204. The verification request 1150 includes the DIDa of the signer 1101, and the electronic document D and the electronic signature 1140 to which the proof 1130 is attached.

Upon reception of the verification request 1150, the verification server 204 verifies the electronic signature 1140 using the public key corresponding to the DIDa of the signer 1101 included in the verification request 1150. Here, the electronic signature 1140 is generated using the private key corresponding to the DIDe of the sender 1102.

Accordingly, the verification is disapproved (electronic document D to which the proof 1130 is attached is not correct). Here, in a case where the hash value of the electronic document D to be verified included in the verification request 1150 matches the hash value of the electronic document D included in the proof 1130, the electronic document D has not been tampered with.

In this case, the verification server 204 may detect that the proof 1130 is fraudulently created. As a result, the verification server 204 is enabled to detect that the electronic document D is signed using the fraudulently created proof 1130.

Next, it is assumed that the signer (requesting destination of the signing request for the electronic document D) of the electronic document D is a malicious signer.

Figure 12:
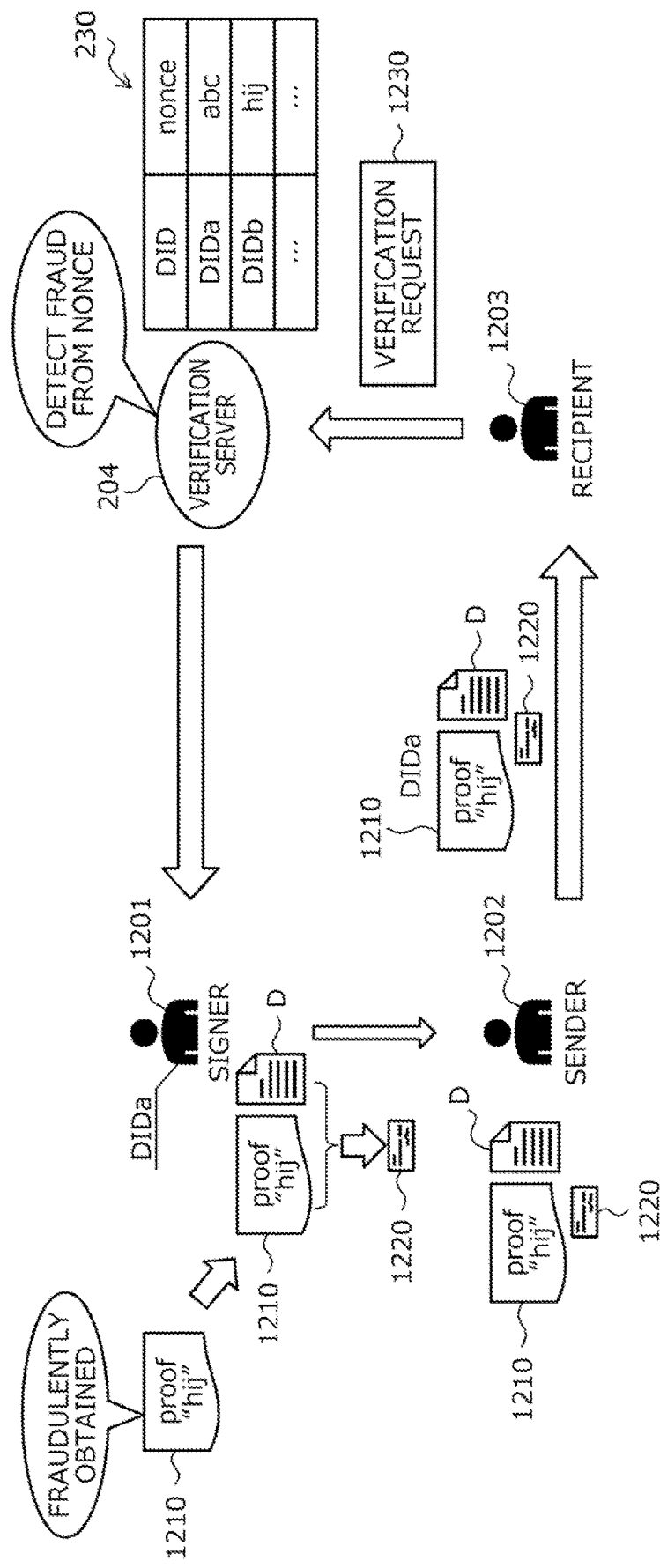
FIG. 12 is an explanatory diagram illustrating second exemplary detection of the proof fraud.

FIG. 12 is an explanatory diagram illustrating second exemplary detection of a proof fraud. In FIG. 12, in response to an offer from a signer 1201 (signature device 201), the verification server 204 creates a nonce "abc" corresponding to the DIDa of the signer 1201, and registers it in the ID management table 230. Furthermore, the verification server 204 transmits the nonce "abc" corresponding to the DIDa of the signer 1201 to the signer 1201 (signature device 201).

The signer 1201 obtains the nonce "abc" corresponding to his/her own DIDa from the verification server 204. Here, it is assumed that the signer 1201 is a malicious signer and has fraudulently obtained a proof 1210 of another person. The proof 1210 includes a nonce "hij" corresponding to DIDb of the another person.

Next, the signer 1201 (signature device 201) generates an electronic signature 1220 for the electronic document D and the proof 1210 using the private key corresponding to his/her own DIDa. The signer 1201 (signature device 201) transmits, to a sender 1202 (user terminal 202), the electronic document D and the proof 1210 to which the electronic signature 1220 is attached in association with his/her own DIDa.

The sender 1202 (user terminal 202) transmits, to a recipient 1203 (user terminal 203), the electronic document D and the electronic signature 1220 to which the proof 1210 is attached in association with the DIDa of the signer 1201.

When the recipient 1203 (user terminal 203) receives the electronic document D and the electronic signature 1220 to which the proof 1210 is attached in association with the DIDa, it transmits a verification request 1230 to the verification server 204. The verification request 1230 includes the DIDa of the signer 1201, and the electronic document D and the electronic signature 1220 to which the proof 1210 is attached.

Upon reception of the verification request 1230, the verification server 204 refers to the ID management table 230 to identify the nonce "abc" corresponding to the DIDa included in the verification request 1230. Next, the verification server 204 determines whether or not the nonce "hij" included in the proof 1210 included in the verification request 1230 matches the identified nonce "abc".

Here, the nonce "hij" does not match the identified nonce "abc". In this case, the verification server 204 detects a fraud (fraudulent acquisition) of the proof 1210. As a result, the verification server 204 is enabled to detect that the electronic document D is signed using the fraudulently obtained proof 1210.

Figure 13:
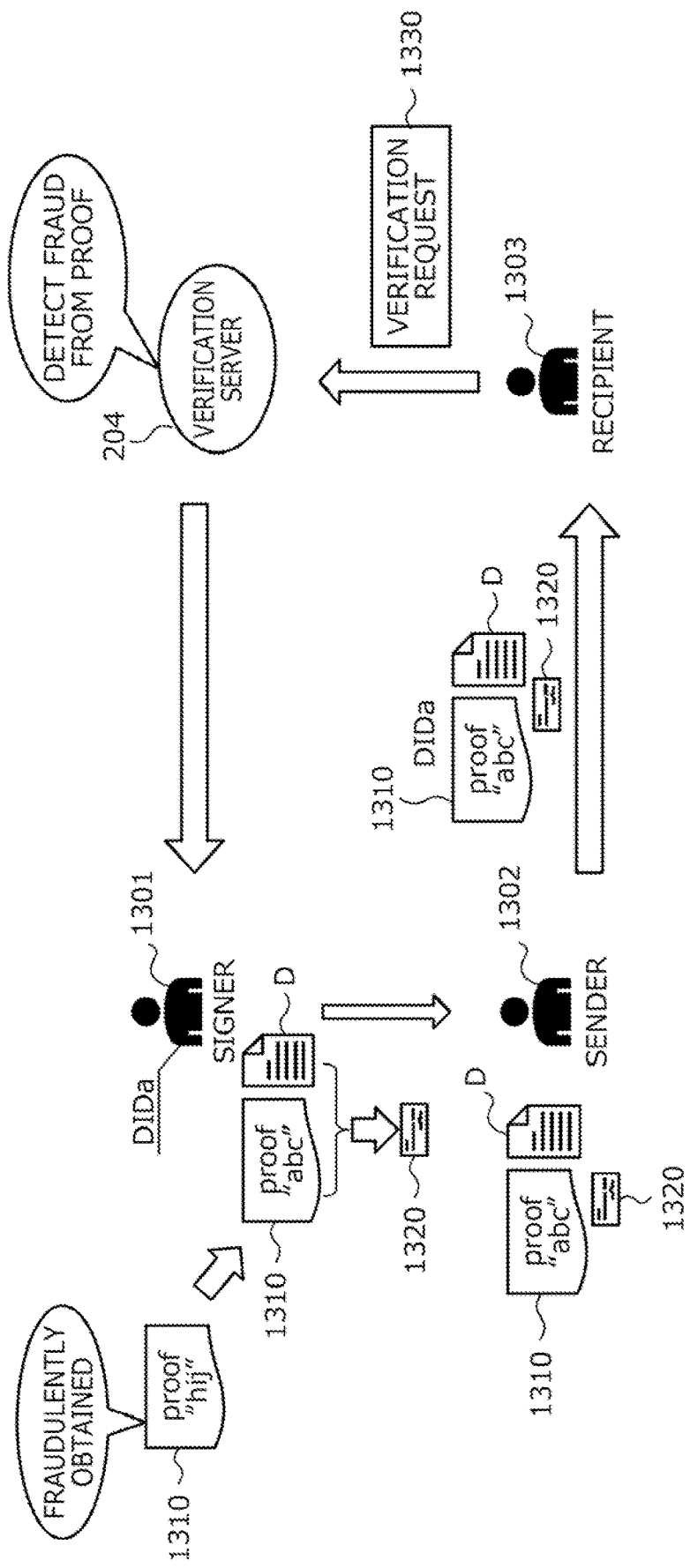
FIG. 13 is an explanatory diagram illustrating third exemplary detection of the proof fraud.

FIG. 13 is an explanatory diagram illustrating third exemplary detection of a proof fraud. In FIG. 13, in response to an offer from a signer 1301 (signature device 201), the verification server 204 creates a nonce "abc" corresponding to the DIDa of the signer 1301, and registers it in the ID management table 230. Furthermore, the verification server 204 transmits the nonce "abc" corresponding to the DIDa of the signer 1301 to the signer 1301 (signature device 201).

Here, it is assumed that the signer 1301 is a malicious signer, and has fraudulently obtained a proof 1310 of another person and has rewritten a nonce "hij" included in the proof 1310 to a nonce "abc" corresponding to his/her own DIDa.

Next, the signer 1301 (signature device 201) generates an electronic signature 1320 for the electronic document D and the proof 1310 using the private key corresponding to his/her own DIDa. The signer 1301 (signature device 201) transmits, to a sender 1302 (user terminal 202), the electronic document D and the proof 1310 to which the electronic signature 1320 is attached in association with his/her own DIDa.

The sender 1302 (user terminal 202) transmits, to a recipient 1303 (user terminal 203), the electronic document D and the electronic signature 1320 to which the proof 1310 is attached in association with the DIDa of the signer 1301.

When the recipient 1303 (user terminal 203) receives the electronic document D and the electronic signature 1320 to which the proof 1310 is attached in association with the DIDa, it transmits a verification request 1330 to the verification server 204. The verification request 1330 includes the DIDa of the signer 1301, and the electronic document D and the electronic signature 1320 to which the proof 1310 is attached.

Upon reception of the verification request 1330, the verification server 204 identifies the attribute information and the certification information from the proof 1310 included in the verification request 1330. Then, the verification server 204 verifies authenticity of the proof 1310 on the basis of the identified attribute information and certification information. Here, the nonce included in the proof 1310 has been rewritten.

Accordingly, the verification is disapproved (proof 1310 has been tampered with). As a result, the verification server 204 is enabled to detect that the electronic document D is signed using the proof 1310 fraudulently obtained by the rewriting of the nonce (however, another piece of information may be rewritten).

(Signature Processing Procedure of Signature Device 201)

Next, a procedure of a signing process of the signature device 201 will be described with reference to FIG. 14. The signing process of the signature device 201 is executed in response to, for example, a signing request for the electronic document D from the user terminal 202.

Figure 14:
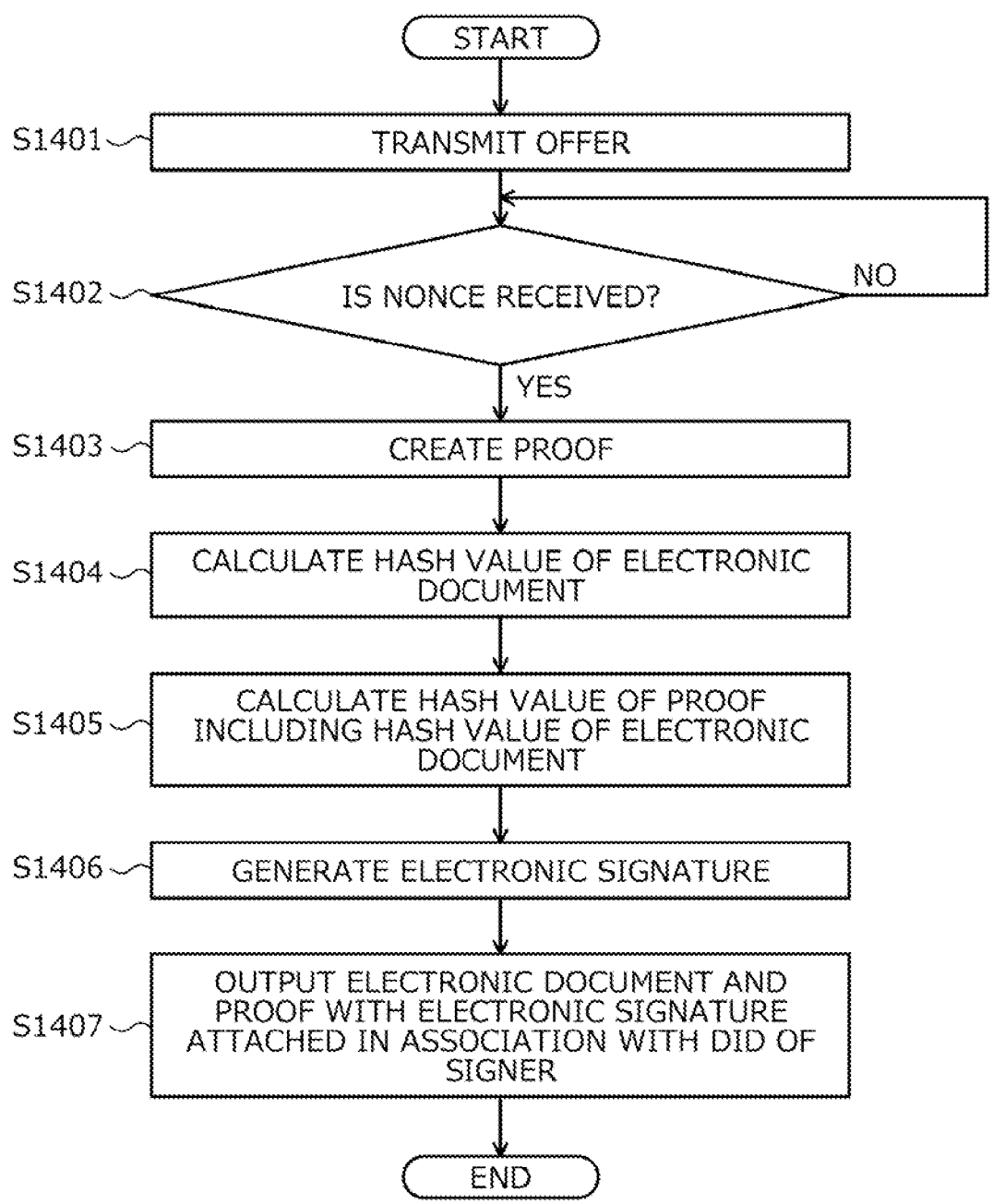
FIG. 14 is a flowchart illustrating an exemplary procedure of a signing process of the signature device 201 according to the first embodiment.

FIG. 14 is a flowchart illustrating an exemplary procedure of the signing process of the signature device 201 according to the first embodiment. In the flowchart of FIG. 14, first, the signature device 201 transmits an offer to the verification server 204 (step S1401). The offer is notification for requesting, to the verification server 204, the nonce needed to create the proof.

Next, the signature device 201 determines whether or not the nonce corresponding to the DID of the signer has been received from the verification server 204 (step S1402). Here, the signature device 201 stands by for the nonce to be received (No in step S1402).

Then, if the signature device 201 has received the nonce (Yes in step S1402), it creates a proof of the signer on the basis of the credential of the signer (step S1403). The proof includes the attribute information of the signer, the certification information for certifying the attribute information, and the nonce corresponding to the DID of the signer.

Next, the signature device 201 calculates a hash value of the electronic document D (step S1404). Then, the signature device 201 calculates a hash value of the proof including the calculated hash value of the electronic document D (step S1405). Next, the signature device 201 encrypts the calculated hash value using the private key corresponding to the DID of the signer, thereby generating an electronic signature (step S1406).

Then, the signature device 201 outputs the electronic document D and the proof to which the generated electronic signature S is attached in association with the DID of the signer (step S1407), and terminates the series of processes according to this flowchart. As a result, it becomes possible to verify the authenticity of the electronic document D, and to detect a fraud of the proof used for confirming the attribute of the signer.

(Verification Processing Procedure of Verification Server 204)

Next, a procedure of a verification process of the verification server 204 will be described with reference to FIG. 15. The verification process of the verification server 204 is executed in response to, for example, a verification request regarding the electronic document D (electronic signature S and proof) from the user terminal 203.

Figure 15:
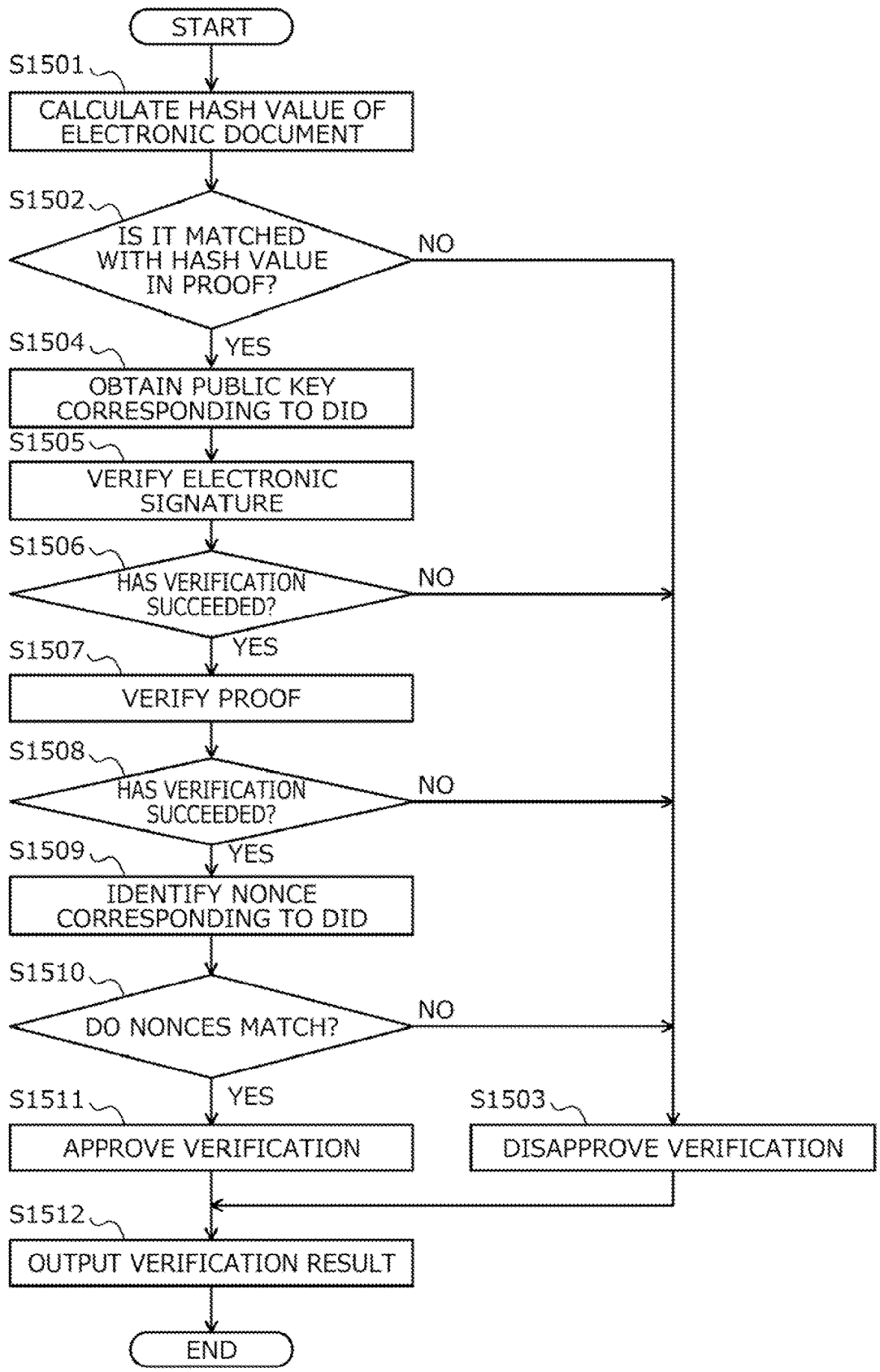
FIG. 15 is a flowchart illustrating an exemplary procedure of a verification process of the verification server 204 according to the first embodiment.

FIG. 15 is a flowchart illustrating an exemplary procedure of the verification process of the verification server 204 according to the first embodiment. In the flowchart of FIG. 15, first, the verification server 204 calculates a hash value of the electronic document D (step S1501). The electronic document D is included in, for example, a verification request from the user terminal 203.

Next, the verification server 204 determines whether or not the calculated hash value matches a hash value of the electronic document D in a proof (step S1502). The proof is included in, for example, the verification request from the user terminal 203.

Here, if the hash values do not match with each other (No in step S1502), the verification server 204 detects that the electronic document D has been tampered with to disapprove the verification (step S1503). Then, the verification server 204 proceeds to step S1512.

On the other hand, if the hash values match with each other (Yes in step S1502), the verification server 204 obtains the public key corresponding to the DID of the signer (step S1504). The DID of the signer is included in, for example, the verification request from the user terminal 203. Then, the verification server 204 verifies the electronic signature S using the obtained public key (step S1505). The electronic signature S is included in, for example, the verification request from the user terminal 203.

Next, the verification server 204 determines whether or not the verification of the electronic signature S has succeeded (step S1506). Here, if the verification of the electronic signature S has failed (No in step S1506), the verification server 204 detects a proof fraud to disapprove the verification (step S1503). Then, the verification server 204 proceeds to step S1512.

On the other hand, if the verification of the electronic signature S has succeeded (Yes in step S1506), the verification server 204 verifies the proof on the basis of the attribute information and the certification information included in the proof (step S1507). Next, the verification server 204 determines whether or not the verification of the proof has succeeded (step S1508).

Here, if the verification of the proof has failed (No in step S1508), the verification server 204 detects that the proof has been tampered with to disapprove the verification (step S1503). Then, the verification server 204 proceeds to step S1512.

On the other hand, if the verification of the proof has succeeded (Yes in step S1508), the verification server 204 refers to the ID management table 230 to identify the nonce corresponding to the DID of the signer (step S1509). Then, the verification server 204 determines whether or not the nonce included in the proof matches the identified nonce (step S1510).

Here, if the nonces do not match with each other (No in step S1510), the verification server 204 detects a proof fraud to disapprove the verification (step S1503). Then, the verification server 204 proceeds to step S1512.

On the other hand, if the nonces match with each other (Yes in step S1510), the verification server 204 approves the verification (step S1511), and outputs a verification result (step S1512). The output destination of the verification result is, for example, the user terminal 203 of the verification request source. As a result, it becomes possible to verify the authenticity of the electronic document D, and to detect a fraud of the proof used for confirming the attribute of the signer.

Note that the execution sequence of the process of steps S1501 and S1502, the process of steps S1504 to S1506, the process of steps S1507 and S1508, and the process of steps S1509 and S1510 may be interchanged. For example, the process of steps S1509 and S1510 may be executed before the process of steps S1501 and S1502.

As described above, according to the information processing system 200 according to the first embodiment, the signature device 201 is enabled to obtain, from the verification server 204, the nonce corresponding to the DID for uniquely identifying the user (signer) in the ID distribution platform 220. Furthermore, the signature device 201 is enabled to create a proof including the attribute information identified from the credential of the user, the certification information for certifying the attribute information, and the nonce. Then, the signature device 201 is enabled to generate the electronic signature S for the electronic document D and the proof using the private key corresponding to the DID, and to output the electronic document D and the proof to which the generated electronic signature S is attached in association with the DID.

As a result, the signature device 201 is enabled to verify the authenticity of the electronic document D, and to detect a fraud of the proof used for confirming the attribute of the signer. Furthermore, the signature device 201 may use decentralized digital ID as an identifier for uniquely identifying the user (signer). Furthermore, the signature device 201 uses a random character string as the nonce to make it difficult to remember the nonce even when the nonce is subject to a stealthy glance, whereby it becomes possible to avoid fraudulent use.

Furthermore, according to the information processing system 200, the signature device 201 is enabled to calculate a hash value of the electronic document D and to create a proof including the calculated hash value at the time of generating the electronic signature S for the electronic document D and the proof. Furthermore, the signature device 201 is enabled to calculate a hash value of the proof including the hash value of the electronic document D, and to generate an electronic signature by encrypting the calculated hash value using the private key corresponding to the DID of the signer.

As a result, the verification server 204 is enabled to verify whether the electronic document D has been tampered with from the hash value included in the proof.

Furthermore, according to the information processing system 200, the verification server 204 receives the electronic document D and the proof to which the electronic signature S is attached in association with the DID (first identifier) for uniquely identifying the signer (user) in the ID distribution platform 220. Then, the verification server 204 refers to the ID management table 230, and in a case where the nonce (first value) included in the proof does not match the nonce corresponding to the DID (first identifier), it detects a proof fraud.

As a result, the verification server 204 is enabled to detect a fraud of the proof used for confirming the attribute of the signer. For example, it becomes possible to detect that the electronic document D has been signed using a proof fraudulently obtained by a malicious signer.

Furthermore, according to the information processing system 200, the verification server 204 is enabled to verify the electronic signature S using the public key corresponding to the DID (first identifier) of the signer.

As a result, the verification server 204 is enabled to verify the authenticity of the electronic document D. For example, in a case where the verification result of the electronic signature S is verification OK, the verification server 204 may detect that both the electronic document D and the proof have not been tampered with. Furthermore, in a case where the verification result of the electronic signature S is verification NG, the verification server 204 may detect that at least one of the electronic document D or the proof has been tampered with.

Furthermore, according to the information processing system 200, in a case where the verification server 204 calculates a hash value of the electronic document D to be signed and the calculated hash value matches the hash value included in the proof, it may detect that the electronic document D has not been tampered with.

As a result, for example, in a case where the verification result of the electronic signature S is verification NG and the hash value of the electronic document D to be signed matches the hash value included in the proof, the verification server 204 may detect that the electronic document D has been signed using a fraudulently created proof.

Furthermore, according to the information processing system 200, the verification server 204 is enabled to verify the proof on the basis of the attribute information and certification information included in the received proof.

As a result, the verification server 204 is enabled to detect that the proof has been tampered with. For example, the verification server 204 is enabled to detect that the electronic document D has been signed using a proof fraudulently obtained by rewriting of the nonce.

As described above, according to the information processing system 200 according to the first embodiment, it becomes possible to prevent fraudulent use of the proof attached to the electronic document D to confirm the attribute of the signer at the time of verifying the authenticity of the electronic document D.

Second Embodiment

Next, an information processing system 200 according to a second embodiment will be described. According to the second embodiment, a signer is enabled to use the same nonce for proofs with different attributes used, or is enabled to use the same proof for different electronic documents D. Note that parts same as the parts described in the first embodiment will be denoted by the same reference signs, and illustration and descriptions thereof will be omitted.

Figure 16:
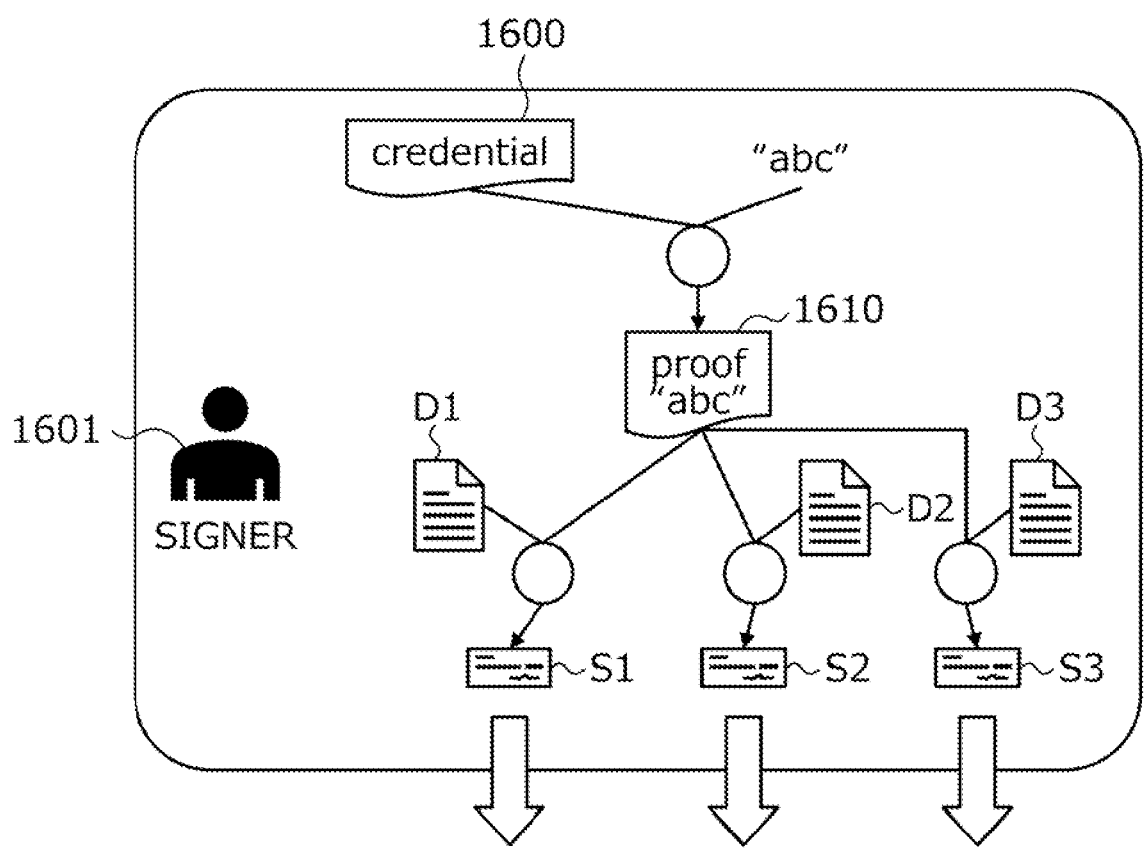
FIG. 16 is an explanatory diagram illustrating exemplary attachment of the proof to a plurality of electronic documents.

FIG. 16 is an explanatory diagram illustrating exemplary attachment of a proof to a plurality of electronic documents. In FIG. 16, a proof 1610 is a proof created from a credential 1600 of a signer 1601 and a nonce "abc" corresponding to DID of the signer 1601. The signer 1601 is enabled to use the same proof 1610 for different electronic documents D as long as it is within a preset upper limit.

In the example of FIG. 16, the proof 1610 is attached to an electronic document D1 to be signed, and an electronic signature S1 for the electronic document D1 and the proof 1610 is generated. Furthermore, the proof 1610 is attached to an electronic document D2 to be signed, and an electronic signature S2 for the electronic document D2 and the proof 1610 is generated. Furthermore, the proof 1610 is attached to an electronic document D3 to be signed, and an electronic signature S3 for the electronic document D3 and the proof 1610 is generated.

As a result, the signer 1601 is enabled to reduce the load of creating a proof at a time of signing a plurality of the electronic documents D (e.g., electronic documents D1 to D3). Note that, although illustration is omitted, the signer 1601 is enabled to use the same nonce "abc" for the proofs using different attributes as long as it is within a preset validity period.

(Exemplary Functional Configuration of Signature Device 201)

Figure 17:
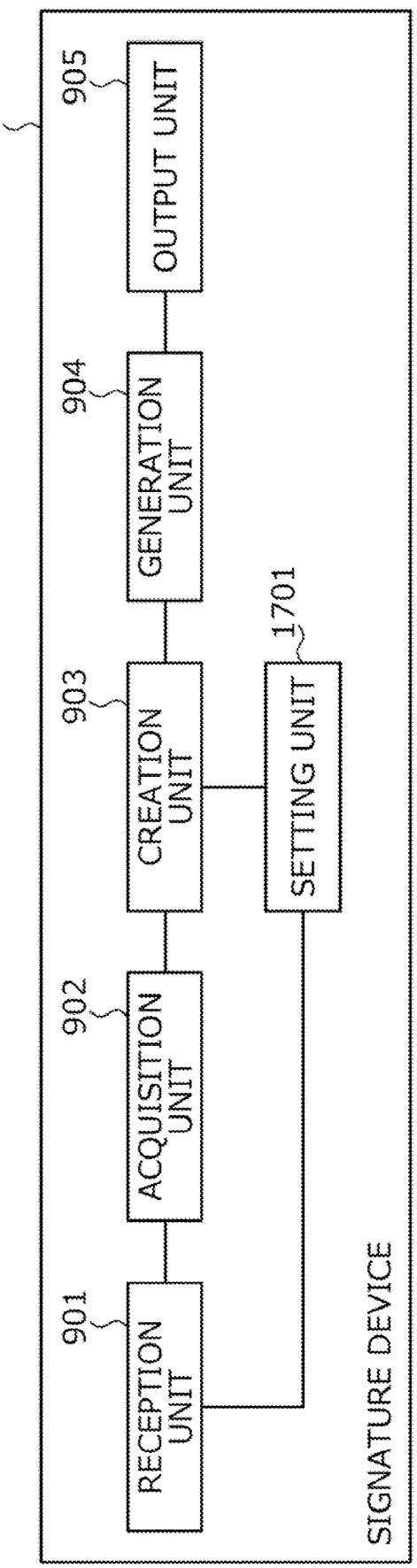
FIG. 17 is a block diagram illustrating an exemplary functional configuration of a signature device 201 according to a second embodiment.

FIG. 17 is a block diagram illustrating an exemplary functional configuration of a signature device 201 according to the second embodiment. In FIG. 17, the signature device 201 includes a reception unit 901, an acquisition unit 902, a creation unit 903, a generation unit 904, an output unit 905, and a setting unit 1701. The reception unit 901 to the output unit 905 and the setting unit 1701 have functions serving as a control unit, and those functions are implemented by causing a CPU 301 to execute a program stored in a storage device such as a memory 302, a disk 304, or a portable recording medium 309, illustrated in FIG. 3, or by a communication I/F 305, for example. A processing result of each functional unit is stored in, for example, a storage device such as the memory 302 or the disk 304.

Hereinafter, among processing contents of the functional units of the signature device 201 according to the second embodiment, processing contents different from the functional units of the signature device 201 according to the first embodiment will be described.

The setting unit 1701 sets a validity period of an obtained nonce. Here, the obtained nonce is a nonce corresponding to the DID of the signer. The validity period is a period of time during which a proof including the obtained nonce may be created. The validity period may be optionally set, and for example, it is set to a time of approximately 10 minutes. The validity period is determined by an agreement between the signer and a verification organization (organization having a verification server 204), for example. For example, the reception unit 901 accepts the designation of the validity period.

The set validity period is stored in, for example, a first management table 1800 as illustrated in FIG. 18 to be described later.

At a time of creating a proof including the obtained nonce, the creation unit 903 determines whether or not the current time point is within the set validity period. In a case the current time point is within the validity period, the creation unit 903 creates a proof including the obtained nonce. On the other hand, in a case where the current time point is out of the validity period, the creation unit 903 does not create a proof including the obtained nonce.

In this case, the creation unit 903 may delete the obtained nonce. The obtained nonce is stored in, for example, a storage device such as the memory 302 or the disk 304. Furthermore, the acquisition unit 902 may obtain a new nonce corresponding to the DID of the signer by transmitting a new offer to the verification server 204.

Furthermore, in a case of being out of the validity period, the output unit 905 may output notification prompting to obtain a new nonce. This notification is displayed on, for example, a display 306 (see FIG. 3). As a result, the signer is enabled to obtain a new nonce corresponding to his/her own DID by issuing a new offer to the verification server 204 in response to this notification.

Furthermore, the setting unit 1701 may set the number of effective uses for the created proof. Here, the number of effective uses indicates the upper limit of the number of times that the created proof may be used. The number of effective uses may be optionally set, and for example, it is set to approximately 10 times. The number of effective uses is determined by, for example, an agreement between the signer and the verification organization. For example, the reception unit 901 accepts the designation of the number of effective uses.

The set number of effective uses is stored in, for example, the first management table 1800 as illustrated in FIG. 18 to be described later.

At the time of creating a proof including the obtained nonce, the creation unit 903 may determine whether or not there is a created proof with the same required attributes. The required attributes are attributes (revealed attribute, unrevealed attribute, and condition certification) to be included in the proof (attribute information). The created proof is stored in, for example, a storage device such as the memory 302 or the disk 304.

Here, in a case where there is a created proof with the same required attributes, the creation unit 903 determines whether or not the number of times the created proof is used exceeds the number of effective uses. Here, in a case where the number of effective uses is not exceeded, the creation unit 903 sets the created proof as a proof to be used this time. In this case, the generation unit 904 generates an electronic signature S using the created proof. On the other hand, in a case where the number of effective uses is exceeded, the creation unit 903 creates a proof including the obtained nonce.

(Contents Stored in First Management Table 1800)

Here, contents stored in the first management table 1800 included in the signature device 201 will be described with reference to FIG. 18. The first management table 1800 is implemented by, for example, a storage device such as the memory 302 or the disk 304.

FIG. 18 is an explanatory diagram illustrating exemplary contents stored in the first management table 1800. In FIG. 18, the first management table 1800 has fields for a nonce, a remaining number of effective uses, a validity period, and a saved proof list, and sets information in each field, thereby storing management information (e.g., management information 1800-1) as a record.

Here, the nonce indicates a nonce corresponding to the DID of the signer (user of the signature device 201). The remaining number of effective uses indicates the remaining number of effective uses of the created proof. The remaining number of effective uses is decremented each time the created proof is diverted. The validity period indicates a validity period of the nonce. The validity period is expressed by the start date and time (start) and the end date and time (end) of the validity period. The saved proof list is a list of proofs created using the nonce.

For example, at a time of creating a proof of the signer (user of the signature device 201), the setting unit 1701 is enabled to determine whether or not the current time point (at the time of creation) is within the validity period set for the nonce corresponding to the DID of the signer by referring to the first management table 1800.

Furthermore, at a time of creating a proof of the signer, the setting unit 1701 is enabled to determine whether or not there is a created proof with the same required attributes by referring to the retained proof list of the first management table 1800. Moreover, the setting unit 1701 is enabled to determine whether or not the number of times the created proof is used exceeds the number of effective uses by referring to the remaining number of effective uses in the first management table 1800.

(Signature Processing Procedure of Signature Device 201)

Next, a procedure of a signing process of the signature device 201 will be described with reference to FIG. 19. The signing process of the signature device 201 is executed at a time of, for example, signing the plurality of electronic documents D.

Figure 19:
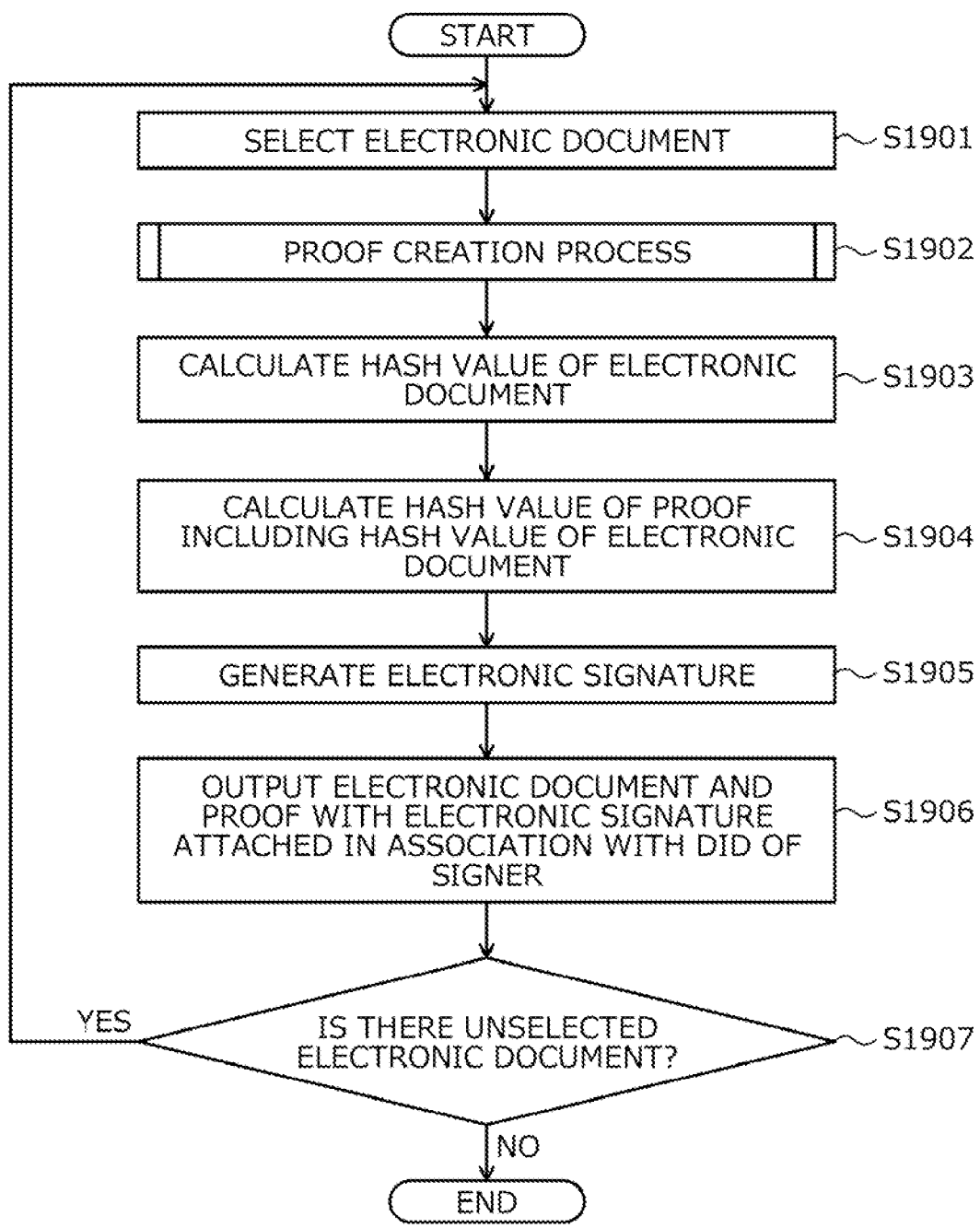
FIG. 19 is a flowchart illustrating an exemplary procedure of a signing process of the signature device 201 according to the second embodiment.

FIG. 19 is a flowchart illustrating an exemplary procedure of the signing process of the signature device 201 according to the second embodiment. In the flowchart of FIG. 19, first, the signature device 201 selects an unselected electronic document D among the electronic documents D to be signed (step S1901).

Then, the signature device 201 executes a proof creation process for creating a proof of the signer (step S1902). A specific processing procedure of the proof creation process will be described later with reference to FIGS. 20 and 21. Next, the signature device 201 calculates a hash value of the electronic document D (step S1903).

Then, the signature device 201 calculates a hash value of the proof including the calculated hash value of the electronic document D (step S1904). Next, the signature device 201 encrypts the calculated hash value using the private key corresponding to the DID of the signer, thereby generating an electronic signature (step S1905).

Then, the signature device 201 outputs the electronic document D and the proof to which the generated electronic signature S is attached in association with the DID of the signer (step S1906). Next, the signature device 201 determines whether or not there is an unselected electronic document D among the electronic documents D to be signed (step S1907).

Here, if there is an unselected electronic document D (Yes in step S1907), the signature device 201 returns to step S1901. On the other hand, if there is no unselected electronic document D (No in step S1907), the signature device 201 terminates the series of processes according to this flowchart.

As a result, at the time of signing the plurality of electronic documents D, it becomes possible to verify the authenticity of each of the electronic documents D, and to detect a fraud of the proof used for confirming the attribute of the signer.

Next, a specific processing procedure of the proof creation process in step S1902 will be described with reference to FIGS. 20 and 21.

Figure 20:
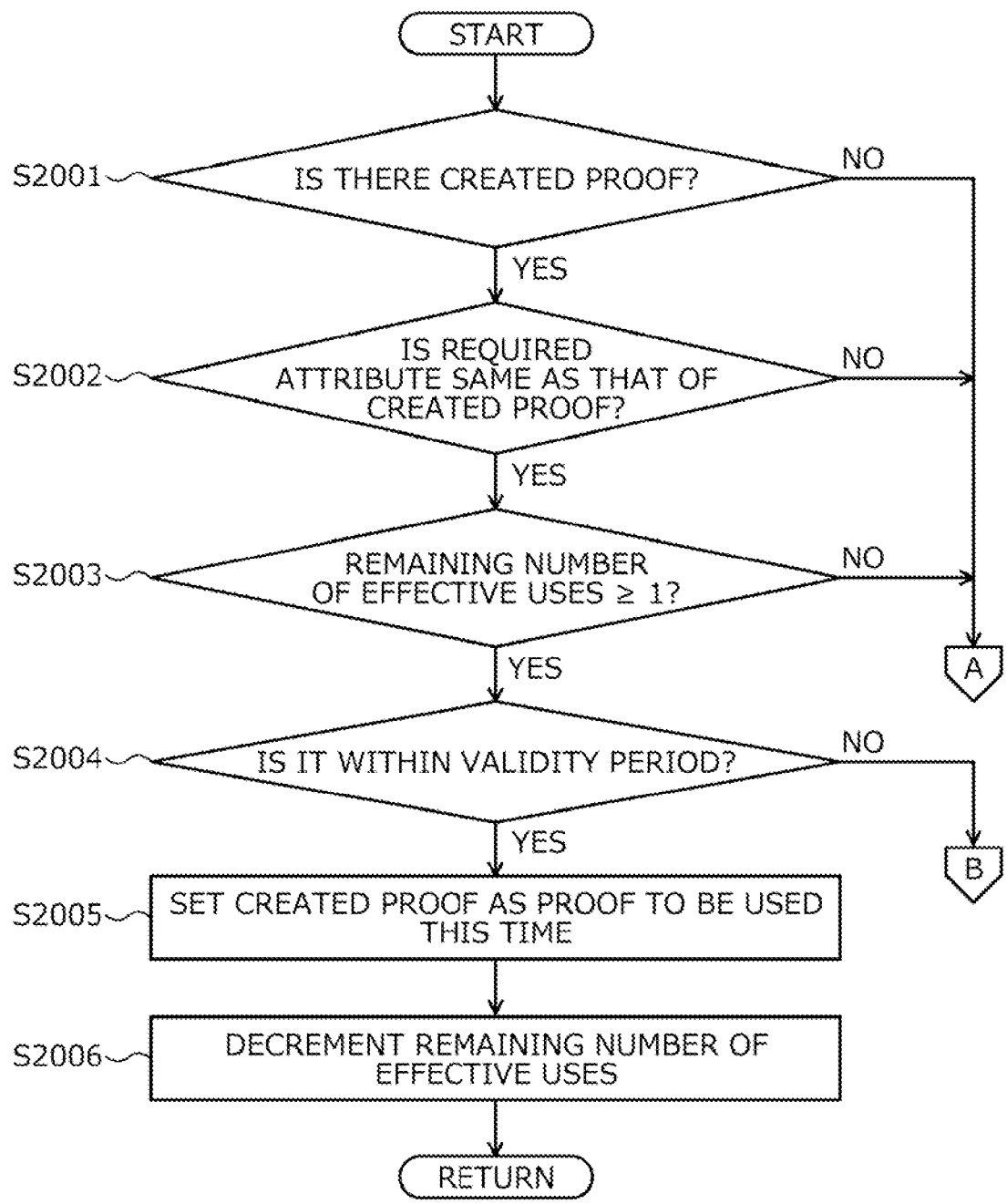
FIG. 20 is a flowchart (No. 1) illustrating an exemplary specific processing procedure of a proof creation process.
Figure 21:
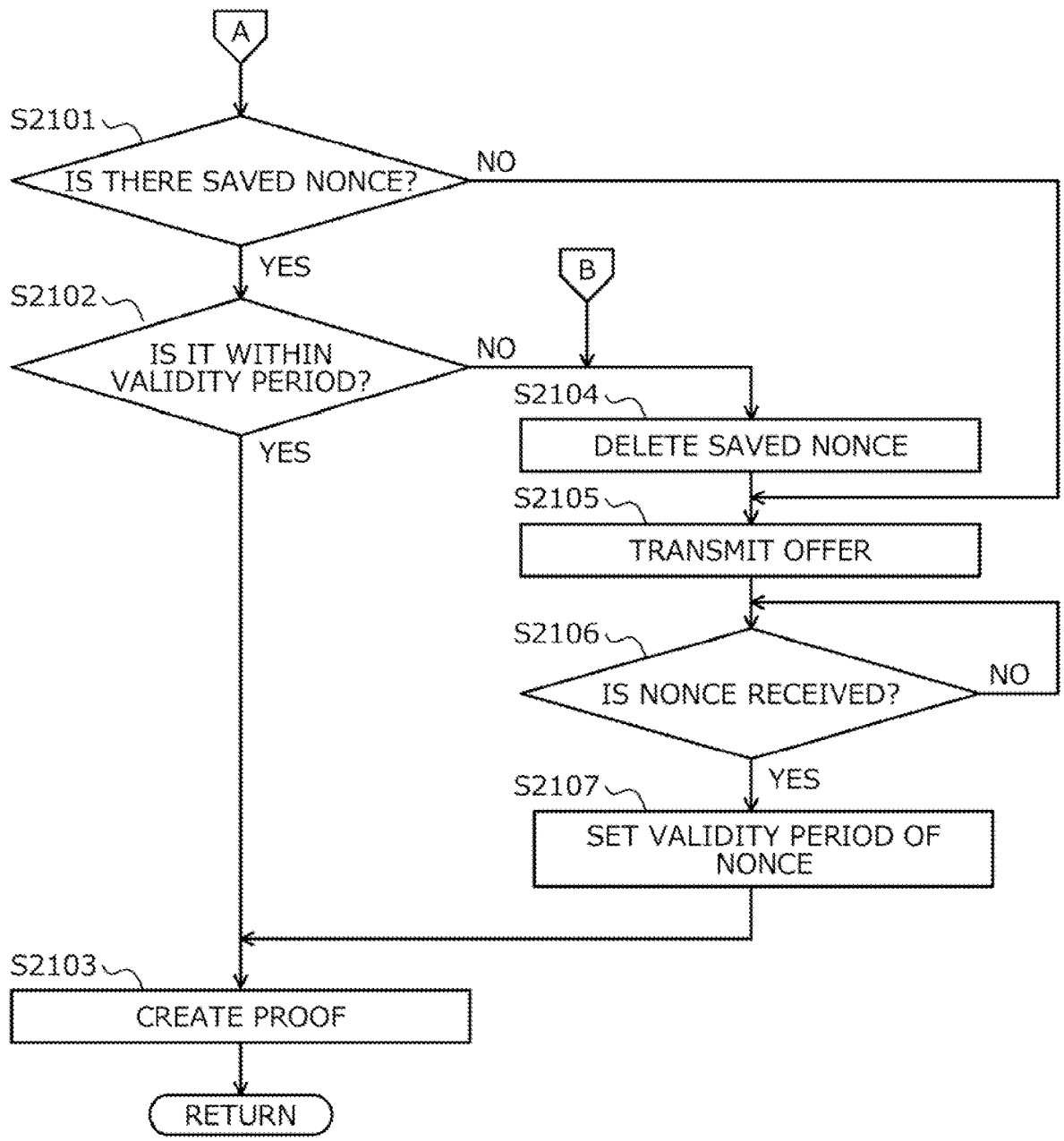
FIG. 21 is a flowchart (No. 2) illustrating an exemplary specific processing procedure of the proof creation process.

FIGS. 20 and 21 are flowcharts illustrating an exemplary processing procedure of the proof creation process. In the flowchart of FIG. 20, first, the signature device 201 refers to the first management table 1800 to determine whether or not there is a created proof (step S2001). Here, if there is no created proof (No in step S2001), the signature device 201 proceeds to step S2101 illustrated in FIG. 21.

On the other hand, if there is a created proof (Yes in step S2001), the signature device 201 determines whether or not the required attributes of the proof to be created this time are the same as those of the created proof (step S2002). Note that the required attributes of the proof to be created this time are specified corresponding to the electronic document D in accordance with an operation input from the user using an input device 307, for example.

Here, if the required attributes are not the same as those of the created proof (No in step S2002), the signature device 201 proceeds to step S2101 illustrated in FIG. 21.

On the other hand, if the required attributes are the same as those of the created proof (Yes in step S2002), the signature device 201 refers to the first management table 1800 to determine whether or not the remaining number of effective uses is one or more (step S2003). Here, if the remaining number of effective uses is zero (No in step S2003), the signature device 201 proceeds to step S2101 illustrated in FIG. 21.

On the other hand, if the remaining number of effective uses is one or more (Yes in step S2003), the signature device 201 refers to the first management table 1800 to determine whether or not the current time point is within the validity period of the nonce included in the created proof (step S2004). Here, if it is out of the validity period (No in step S2004), the signature device 201 proceeds to step S2104 illustrated in FIG. 21.

On the other hand, if it is within the validity period (Yes in step S2004), the signature device 201 sets the created proof with the same required attributes as a proof to be used this time (step S2005). Then, the signature device 201 decrements the remaining number of effective uses (step S2006), and returns to the step in which the proof creation process is called.

In the flowchart of FIG. 21, first, the signature device 201 refers to the first management table 1800 to determine whether or not there is a saved nonce (step S2101). Here, if there is no saved nonce (No in step S2101), the signature device 201 proceeds to step S2105.

On the other hand, if there is a saved nonce (Yes in step S2101), the signature device 201 refers to the first management table 1800 to determine whether or not the current time point is within the validity period of the saved nonce (step S2102). Here, if it is within the validity period (Yes in step S2102), the signature device 201 creates a proof of the signer on the basis of the credential of the signer (step S2103), and returns to the step in which the proof creation process is called.

On the other hand, if it is out of the validity period (No in step S2102), the signature device 201 deletes the saved nonce (step S2104). Then, the signature device 201 transmits an offer to the verification server 204 (step S2105). The offer is notification for requesting, to the verification server 204, the nonce needed to create the proof. Note that, in step S2105, the transmission of the offer is carried out in accordance with an operation input from the user, for example.

Next, the signature device 201 determines whether or not the nonce corresponding to the DID of the signer has been received from the verification server 204 (step S2106). Here, the signature device 201 stands by for the nonce to be received (No in step S2106). Then, if the signature device 201 has received the nonce (Yes in step S2106), it sets a validity period of the nonce (step S2107), and proceeds to step S2103.

As a result, it becomes possible to reduce the processing load for creating the proof at the time of signing the plurality of electronic documents D and the communication volume (offer and nonce) between the signature device 201 and the verification server 204. Furthermore, by setting the validity period of the nonce and the number of effective uses of the proof, it becomes possible to avoid unlimited use of the nonce and proof and to make it easier to perform management.

Furthermore, the validity period of the nonce corresponding to the DID of the signer and the number of effective uses of the created proof may be managed by, for example, the verification server 204. In this case, for example, at the time of verifying the authenticity of the electronic document D, the verification server 204 may determine that the verification is disapproved in a case where the nonce out of the validity period is used or the proof is used more than the number of effective uses.

Note that an exemplary functional configuration of the verification server 204 according to the second embodiment is similar to the exemplary functional configuration of the verification server 204 according to the first embodiment (see FIG. 10), and thus illustration thereof is omitted. Hereinafter, processing contents different from those of the verification server 204 according to the first embodiment will be described with reference to FIGS. 22 to 24.

(Contents Stored in Second Management Table 2200)

Here, contents stored in a second management table 2200 included in the verification server 204 will be described with reference to FIG. 22. The second management table 2200 is implemented by, for example, a storage device such as the memory 302 or the disk 304.

FIG. 22 is an explanatory diagram illustrating exemplary contents stored in the second management table 2200. In FIG. 22, the second management table 2200 has fields for DID, a nonce, a remaining number of effective uses, a validity period, and a verified proof list, and sets information in each field, thereby storing management information (e.g., management information 2200-1 and 2200-2) as records.

Here, the DID is an identifier for uniquely identifying the user in the ID distribution platform 220. The nonce is a nonce corresponding to the DID. The remaining number of effective uses indicates the remaining number of effective uses of the created proof. The validity period indicates a validity period of the nonce. The verified proof list is a list of verified proofs.

(Verification Processing Procedure of Verification Server 204)

Next, a procedure of a verification process of the verification server 204 will be described with reference to FIG. 23. The verification process of the verification server 204 is executed in response to, for example, a verification request regarding the electronic document D (electronic signature S and proof) from the user terminal 203. In a case of a verification request for a plurality of the electronic documents D, the verification process of the verification server 204 is executed for each of the plurality of electronic documents D.

Figure 23:
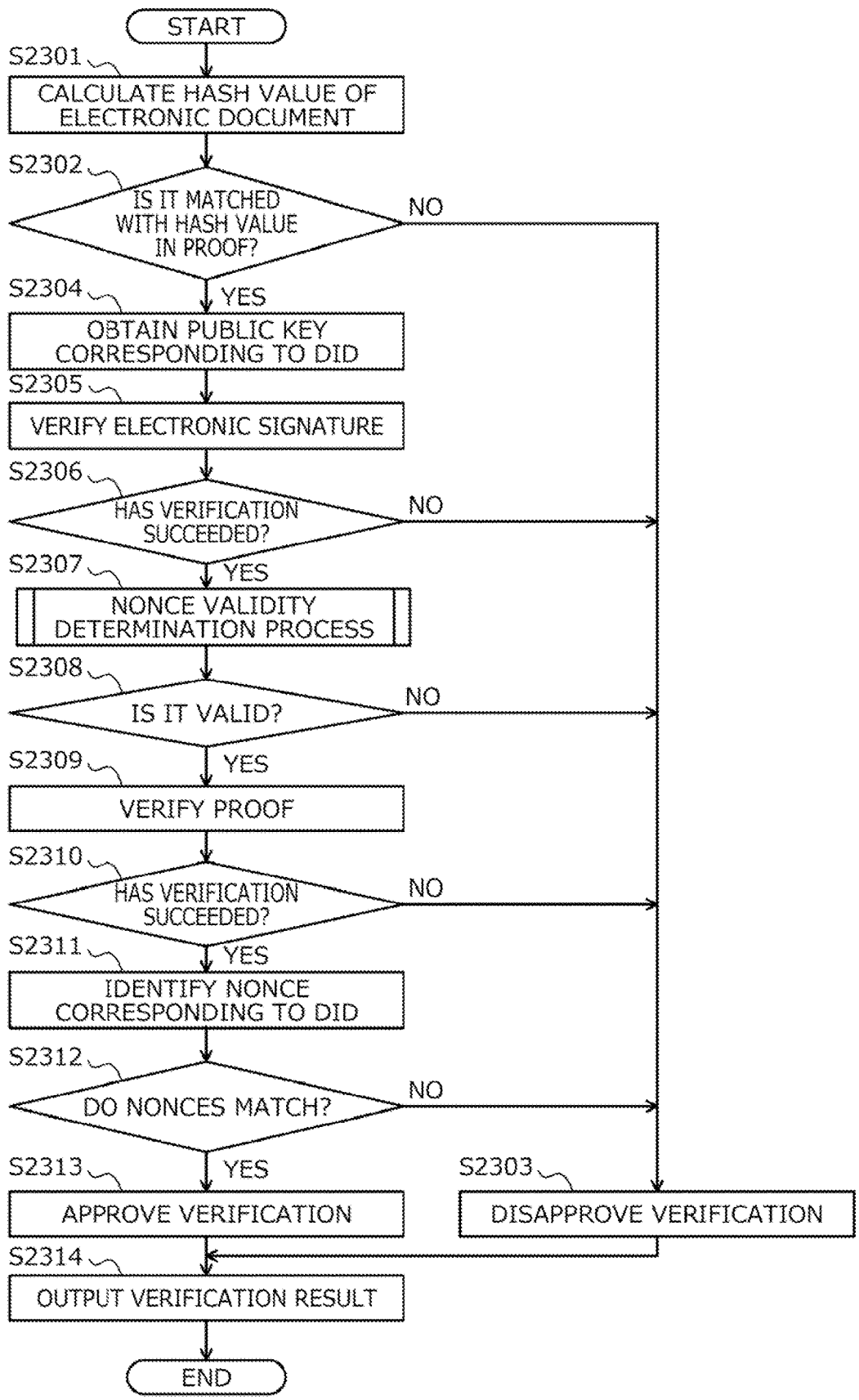
FIG. 23 is a flowchart illustrating an exemplary procedure of a verification process of a verification server 204 according to the second embodiment.

FIG. 23 is a flowchart illustrating an exemplary procedure of the verification process of the verification server 204 according to the second embodiment. In the flowchart of FIG. 23, first, the verification server 204 calculates a hash value of the electronic document D (step S2301). The electronic document D is included in, for example, a verification request from the user terminal 203.

Next, the verification server 204 determines whether or not the calculated hash value matches a hash value of the electronic document D in a proof (step S2302). The proof is included in, for example, the verification request from the user terminal 203.

Here, if the hash values do not match with each other (No in step S2302), the verification server 204 detects that the electronic document D has been tampered with to disapprove the verification (step S2303). Then, the verification server 204 proceeds to step S2314.

On the other hand, if the hash values match with each other (Yes in step S2302), the verification server 204 obtains the public key corresponding to the DID of the signer (step S2304). The DID of the signer is included in, for example, the verification request from the user terminal 203. Then, the verification server 204 verifies the electronic signature S using the obtained public key (step S2305). The electronic signature S is included in, for example, the verification request from the user terminal 203.

Next, the verification server 204 determines whether or not the verification of the electronic signature S has succeeded (step S2306). Here, if the verification of the electronic signature S has failed (No in step S2306), the verification server 204 detects a proof fraud to disapprove the verification (step S2303). Then, the verification server 204 proceeds to step S2314.

On the other hand, if the verification of the electronic signature S has succeeded (Yes in step S2306), the verification server 204 executes a nonce validity determination process (step S2307). Note that a specific processing procedure of the nonce validity determination process will be described later with reference to FIG. 24. Then, the verification server 204 determines whether or not the determination result is valid (step S2308).

Here, if the determination result is not valid (No in step S2308), the verification server 204 detects that the nonce is not valid, and disapprove the verification (step S2303). Then, the verification server 204 proceeds to step S2314.

On the other hand, if the determination result is valid (Yes in step S2308), the verification server 204 verifies the proof on the basis of the attribute information and the certification information included in the proof (step S2309). Next, the verification server 204 determines whether or not the verification of the proof has succeeded (step S2310).

Here, if the verification of the proof has failed (No in step S2310), the verification server 204 detects that the proof has been tampered with to disapprove the verification (step S2303). Then, the verification server 204 proceeds to step S2314.

On the other hand, if the verification of the proof has succeeded (Yes in step S2310), the verification server 204 refers to the second management table 2200 to identify the nonce corresponding to the DID of the signer (step S2311). Then, the verification server 204 determines whether or not the nonce included in the proof matches the identified nonce (step S2312).

Here, if the nonces do not match with each other (No in step S2312), the verification server 204 detects a proof fraud to disapprove the verification (step S2303). Then, the verification server 204 proceeds to step S2314.

On the other hand, if the nonces match with each other (Yes in step S2312), the verification server 204 approves the verification (step S2313), and outputs a verification result (step S2314). The output destination of the verification result is, for example, the user terminal 203 of the verification request source.

As a result, it becomes possible to verify the authenticity of the electronic document D, and to detect a fraud of the proof used for confirming the attribute of the signer. Furthermore, it becomes possible to determine the validity of the nonce, and to detect a proof using an invalid nonce.

Note that the verified proof is registered in the verified proof list in the second management table 2200. Furthermore, each time a proof is verified, the remaining number of effective uses corresponding to the nonce included in the proof is decremented. However, in consideration of a case of executing the verification application programming interface (API) multiple times for the same proof, for example, the verification server 204 does not change the remaining number of effective uses at a time of verifying the verified proof. The verified proof is identified from the verified proof list.

Next, a specific processing procedure of the nonce validity determination process in step S2307 will be described with reference to FIG. 24.

Figure 24:
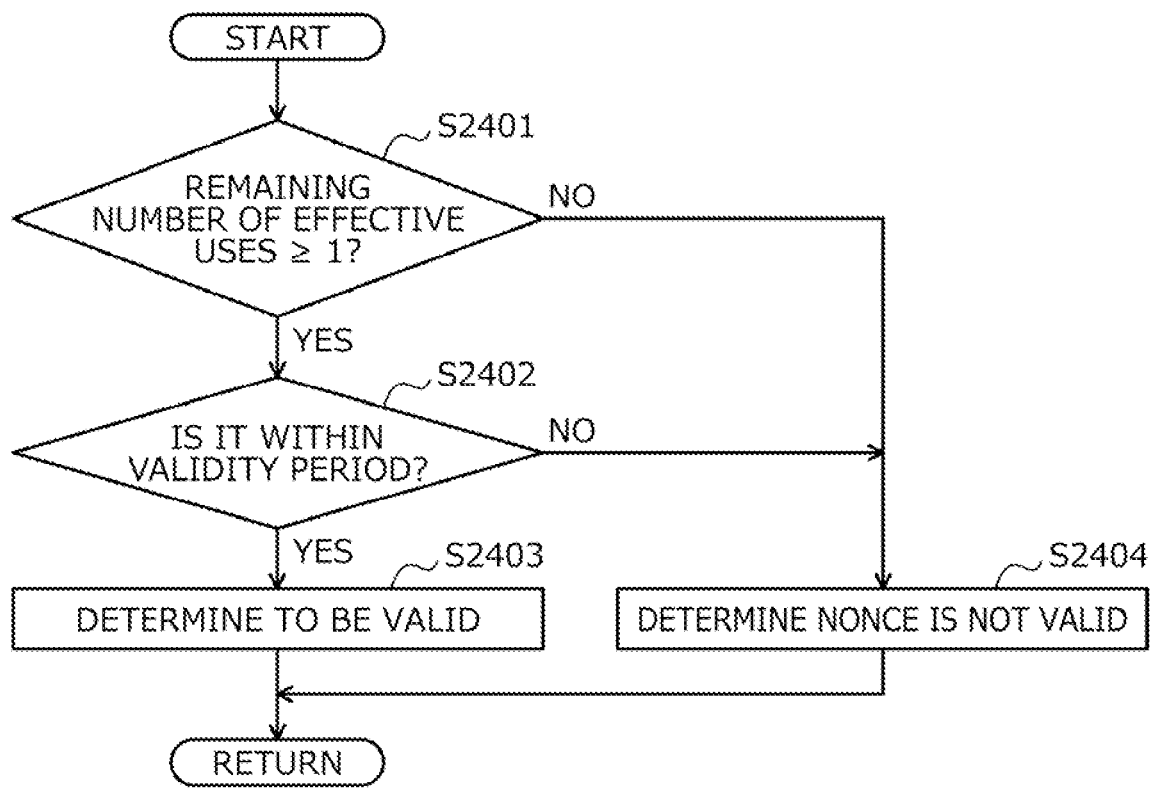
FIG. 24 is a flowchart illustrating an exemplary specific processing procedure of a nonce validity determination process.

FIG. 24 is a flowchart illustrating an exemplary specific processing procedure of the nonce validity determination process. In the flowchart of FIG. 24, first, the verification server 204 refers to the second management table 2200 to determine whether or not the remaining number of effective uses corresponding to the nonce included in the proof is one or more (step S2401).

Here, if the remaining number of effective uses is zero (No in step S2401), the verification server 204 proceeds to step S2404. On the other hand, if the remaining number of effective uses is one or more (Yes in step S2401), the verification server 204 refers to the second management table 2200 to determine whether or not the time point at which the proof is created is within the validity period of the nonce included in the proof (step S2402). The time point at which the proof is created is included in, for example, the proof.

Here, if it is within the validity period (Yes in step S2402), the verification server 204 determines that the nonce is valid (step S2403), and returns to the step in which the nonce validity determination process is called. On the other hand, if it is out of the validity period (No in step S2402), the verification server 204 determines that the nonce is not valid (step S2404), and returns to the step in which the nonce validity determination process is called.

As a result, it becomes possible to determine the validity of the nonce on the basis of the validity period set for the nonce corresponding to the DID of the signer and the number of effective uses set for the proof including the nonce. However, the verification server 204 does not necessarily make a determination regarding the validity period and the number of effective uses.

According to the information processing system 200 according to the second embodiment described above, the signature device 201 is enabled to set, to an obtained nonce, a validity period during which a proof including the nonce may be created. For example, at the time of creating a proof including the obtained nonce, the signature device 201 determines whether or not the current time point is within the set validity period. Here, in a case where it is within the validity period, the signature device 201 creates a proof including the obtained nonce. On the other hand, in a case where it is out of the validity period, the signature device 201 does not create a proof including the obtained nonce.

As a result, the signature device 201 is enabled to use the same nonce to create a plurality of proofs as long as it is within the validity period. Accordingly, the signature device 201 is enabled to reduce the processing load for creating a proof at the time of signing the plurality of electronic documents D and the communication volume (offer and nonce) with the verification server 204.

Furthermore, according to the information processing system 200, the signature device 201 is enabled to set the number of effective uses of the proof including the obtained nonce. For example, at the time of creating a proof including the obtained nonce, the signature device 201 determines whether or not there is a created proof with the same required attributes and the number of times the created proof is used exceeds the number of effective uses. Here, in a case where the number of effective uses is not exceeded, the signature device 201 sets the created proof as a proof to be used this time. On the other hand, in a case where the number of effective uses is exceeded, the signature device 201 does not set the created proof as a proof to be used this time.

As a result, the signature device 201 is enabled to use the created proof for different electronic documents D as long as it is within the number of effective uses. Accordingly, the signature device 201 is enabled to reduce the processing load for creating a proof at the time of signing the plurality of electronic documents D and the communication volume (offer and nonce) with the verification server 204.

As described above, according to the information processing system 200 according to the second embodiment, it becomes possible to speed up the proof attaching process for the electronic document D. Furthermore, by allowing multiple proofs using the same nonce to be used, it becomes possible to reduce the size of the management table of the verification server 204 as compared with the case of preparing the nonce for each electronic document D, for example.

Note that the information processing method described in the present embodiment may be implemented by executing a program prepared in advance on a computer such as a personal computer or a workstation. The present information processing program is recorded on a computer-readable recording medium such as a hard disk, a flexible disk, a CD-ROM, a DVD, or a USB memory, and is read from the recording medium to be executed by a computer. Furthermore, the present information processing program may be distributed via a network such as the Internet.

Furthermore, the first information processing apparatus 101 (signature device 201) and the second information processing apparatus 102 (verification server 204) described in the present embodiment may also be implemented by a special-purpose integrated circuit (IC) such as a standard cell or a structured application specific integrated circuit (ASIC) or a programmable logic device (PLD) such as a field-programmable gate array (FPGA).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information processing program to be executed by a first information processing apparatus in a system capable of issuing credential of each user, the program including instructions for causing a processor of the first information processing apparatus to execute processing comprising:
   obtaining, from a second information processing apparatus in the system, a value unique to an identifier that uniquely identifies a user, the second information processing apparatus being a device capable of verifying authenticity of an electronic document to be signed;
   creating proof that includes attribute information identified from the credential, certification information that certifies the attribute information, and the obtained value;
   generating an electronic signature for the electronic document and the proof using a private key that corresponds to the identifier; and
   outputting the electronic document and the proof to which the generated electronic signature is attached in association with the identifier,
   the obtained value is associated with an upper limit indicating two or more corresponding to a number of times that the proof including the obtained value is allowed to be used.

2. The non-transitory computer-readable recording medium according to claim 1, wherein the obtained value is associated with a validity period being a period of time during which the proof including the obtained value is allowed to be created.

3. A non-transitory computer-readable recording medium storing an information processing program to be executed by a second information processing apparatus in a system capable of issuing credential of each user, the program including instructions for causing a processor of the second information processing apparatus to execute processing comprising:
   receiving an electronic document and proof to which an electronic signature is attached in association with a first identifier that uniquely identifies the user; and
   referring to information that indicates a correspondence relationship between an identifier that uniquely identifies each user in the system and a value unique to the identifier and detecting a fraud of the proof in a case where a first value included in the proof does not match a value that corresponds to the first identifier,
   the obtained value is associated with an upper limit indicating two or more corresponding to a number of times that the proof including the obtained value is allowed to be used.

4. The non-transitory computer-readable recording medium according to claim 3, the processing further comprising: verifying the electronic signature using a public key corresponding to the first identifier.

5. The non-transitory computer-readable recording medium according to claim 3, the processing further comprising: verifying the proof based on attribute information and certification information included in the proof.

6. A first information processing apparatus in a system capable of issuing credential of each user, the first information processing apparatus comprising:
a memory; and
a processor coupled to the memory, the processor being configured to perform processing including:
obtaining, from a second information processing apparatus in the system, a value unique to an identifier that uniquely identifies a user, the second information processing apparatus being a device capable of verifying authenticity of an electronic document to be signed;
creating proof that includes attribute information identified from the attribute certificate information, certification information that certifies the credential, and the obtained value;
generating an electronic signature for the electronic document and the proof using a private key that corresponds to the identifier; and
outputting the electronic document and the proof to which the generated electronic signature is attached in association with the identifier,
the obtained value is associated with an upper limit indicating two or more corresponding to a number of times that the proof including the obtained value is allowed to be used.

7. A second information processing apparatus in a system capable of issuing credential of each user, the second information processing apparatus comprising:
a memory; and
a processor coupled to the memory, the processor being configured to perform processing including:
receiving an electronic document and proof to which an electronic signature is attached in association with a first identifier that uniquely identifies the user; and
referring to information that indicates a correspondence relationship between an identifier that uniquely identifies each user in the system and a value unique to the identifier and detecting a fraud of the proof in a case where a first value included in the proof does not match a value that corresponds to the first identifier,
the obtained value is associated with an upper limit indicating two or more corresponding to a number of times that the proof including the obtained value is allowed to be used.

8. A system of issuing credential of each user, the system comprising:
a first information processing apparatus; and
a second information processing apparatus,
the first information processing apparatus including a memory, and a processor circuit configured to perform processing including:
obtaining, from a second information processing apparatus in the system, a value unique to an identifier that uniquely identifies a user, the second information processing apparatus being a device capable of verifying authenticity of an electronic document to be signed;
creating proof that includes attribute information identified from the credential, certification information that certifies the attribute information, and the obtained value;
generating an electronic signature for the electronic document and the proof using a private key that corresponds to the identifier; and
outputting the electronic document and the proof to which the generated electronic signature is attached in association with the identifier,
the second information processing apparatus including a memory, and a processor circuit configured to perform processing including:
receiving an electronic document and proof to which an electronic signature is attached in association with a first identifier that uniquely identifies the user; and
referring to information that indicates a correspondence relationship between an identifier that uniquely identifies each user in the system and a value unique to the identifier and detecting a fraud of the proof in a case where a first value included in the proof does not match a value that corresponds to the first identifier,
the obtained value is associated with an upper limit indicating two or more corresponding to a number of times that the proof including the obtained value is allowed to be used.

* * * * *